United States Patent
Takeuchi et al.

(10) Patent No.: US 12,534,705 B2
(45) Date of Patent: Jan. 27, 2026

(54) METHOD FOR PRODUCING PLURIPOTENT STEM CELLS

(71) Applicant: KANEKA CORPORATION, Osaka (JP)

(72) Inventors: Kazuhiro Takeuchi, Kyoto (JP); Masato Ibuki, Tokyo (JP)

(73) Assignee: KANEKA CORPORATION, Osaka (JP)

( * ) Notice: Subject to any disclaimer, the term of this patent is extended or adjusted under 35 U.S.C. 154(b) by 1034 days.

(21) Appl. No.: 17/598,016

(22) PCT Filed: Mar. 25, 2020

(86) PCT No.: PCT/JP2020/013268
§ 371 (c)(1),
(2) Date: Sep. 24, 2021

(87) PCT Pub. No.: WO2020/203532
PCT Pub. Date: Oct. 8, 2020

(65) Prior Publication Data
US 2022/0195383 A1    Jun. 23, 2022

(30) Foreign Application Priority Data
Mar. 29, 2019   (JP) ................. 2019-066844

(51) Int. Cl.
*C12N 5/073*  (2010.01)

(52) U.S. Cl.
CPC ........ *C12N 5/0603* (2013.01); *C12N 2500/44* (2013.01); *C12N 2501/115* (2013.01); *C12N 2501/155* (2013.01); *C12N 2501/16* (2013.01); *C12N 2506/45* (2013.01)

(58) Field of Classification Search
CPC .............. C12N 5/0603; C12N 2506/45; C12N 2501/415; C12N 5/0696
See application file for complete search history.

(56) References Cited

U.S. PATENT DOCUMENTS

| | | |
|---|---|---|
| 2008/0213231 A1 | 9/2008 | Oh et al. |
| 2014/0341864 A1* | 11/2014 | Nakano ............... A61L 27/3895 435/363 |
| 2018/0094241 A1 | 4/2018 | Takahashi et al. |
| 2019/0284526 A1* | 9/2019 | Amit ....................... C07K 14/81 |

FOREIGN PATENT DOCUMENTS

| | | |
|---|---|---|
| EP | 2 952 579 A1 | 12/2015 |
| EP | 3 575 392 A1 | 12/2019 |
| WO | WO 2007/010858 A1 | 1/2007 |
| WO | WO 2013/077425 A1 | 5/2013 |
| WO | WO 2014/119219 A1 | 8/2014 |
| WO | WO 2016/167372 A1 | 10/2016 |
| WO | WO 2018/139548 A1 | 8/2018 |

OTHER PUBLICATIONS

Milo et al. Nucl. Acids Res. (2010) 38 (suppl 1): D750-D753; BNID: 108885 (Year: 2010).*
International Search Report for PCT/JP2020/013268 mailed on Jun. 16, 2020.
Kim et al., "Botulinum hemagglutinin-mediated selective removal of cells deviating from the undifferentiated state in hiPSC colonies", Scientific Reports, Mar. 7, 2017, 7: 93, total 12 pages.
Kurek et al., "Endogenous WNT Signals Mediate BMP-Induced and Spontaneous Differentiation of Epiblast Stem Cells and Human Embryonic Stem Cells", Stem Cell Reports, Jan. 13, 2015, vol. 4, pp. 114-128, total 35 pages.
Olmer et al., "Suspension Culture of Human Pluripotent Stem Cells in Controlled, Stirred Bioreactors", Tissue Engineering: Part C, 2012, vol. 18, No. 10, pp. 772-784.
Yabe et al., "Efficient generation of functional pancreatic B-cells from human induced pluripotent stem cells", Journal of Diabetes, 2017, vol. 9, pp. 168-179.

* cited by examiner

*Primary Examiner* — Maria G Leavitt
*Assistant Examiner* — Michael Angelo Riga
(74) *Attorney, Agent, or Firm* — Birch, Stewart, Kolasch & Birch, LLP

(57) ABSTRACT

A method for producing pluripotent stem cells includes a step of performing suspension culture of pluripotent stem cells under a condition in which an amount, which is calculated by the following Equation (1), of WNT protein contained in a unit of a medium in contact with a unit area of a cell surface of a pluripotent stem cell is maintained at $2.9 \times 10^2$ µg/mL·cm² or less.

(Amount of WNT protein contained in unit of medium in contact with unit area of cell surface)=(concentration of WNT protein in medium)/(surface area in contact with medium per cell)   (1)

5 Claims, 13 Drawing Sheets

Specification includes a Sequence Listing.

⟨ADHESION CULTURE⟩

LINE 201B7

⟨ADHESION CULTURE⟩

LINE RPChiPS771-2

⟨SUSPENSION CULTURE⟩

LINE 201B7

⟨SUSPENSION CULTURE⟩

⟨SUSPENSION CULTURE + IWP-2⟩

DAY 5 OF CULTURE    DAY 10 OF CULTURE

LINE
201B7

⟨SUSPENSION CULTURE + IWP-2⟩

DAY 5 OF CULTURE    DAY 10 OF CULTURE

LINE
RPChiPS771-2

SEQUENCE LISTING

```
<160> NUMBER OF SEQ ID NOS: 28

<210> SEQ ID NO 1
<211> LENGTH: 21
<212> TYPE: DNA
<213> ORGANISM: Artificial Sequence
<220> FEATURE:
<223> OTHER INFORMATION: Description of Artificial Sequence: primer

<400> SEQUENCE: 1
cctcatgaag atcctcaccg a                                         21

<210> SEQ ID NO 2
<211> LENGTH: 21
<212> TYPE: DNA
<213> ORGANISM: Artificial Sequence
<220> FEATURE:
<223> OTHER INFORMATION: Description of Artificial Sequence: primer

<400> SEQUENCE: 2
ttgccaatgg tgatgacctg g                                         21

<210> SEQ ID NO 3
<211> LENGTH: 23
<212> TYPE: DNA
<213> ORGANISM: Artificial Sequence
<220> FEATURE:
<223> OTHER INFORMATION: Description of Artificial Sequence: primer

<400> SEQUENCE: 3
agtgggtgga ggaagctgac aac                                       23

<210> SEQ ID NO 4
<211> LENGTH: 24
<212> TYPE: DNA
```

```
<213> ORGANISM: Artificial Sequence
<220> FEATURE:
<223> OTHER INFORMATION: Description of Artificial Sequence: primer

<400> SEQUENCE: 4
tcgttgtgca tagtcgctgc ttga                                          24

<210> SEQ ID NO 5
<211> LENGTH: 22
<212> TYPE: DNA
<213> ORGANISM: Artificial Sequence
<220> FEATURE:
<223> OTHER INFORMATION: Description of Artificial Sequence: primer

<400> SEQUENCE: 5
caccaatccc atccacactc ac                                            22

<210> SEQ ID NO 6
<211> LENGTH: 21
<212> TYPE: DNA
<213> ORGANISM: Artificial Sequence
<220> FEATURE:
<223> OTHER INFORMATION: Description of Artificial Sequence: primer

<400> SEQUENCE: 6
gcaaagctcc taccgtacca c                                             21

<210> SEQ ID NO 7
<211> LENGTH: 24
<212> TYPE: DNA
<213> ORGANISM: Artificial Sequence
<220> FEATURE:
<223> OTHER INFORMATION: Description of Artificial Sequence: primer

<400> SEQUENCE: 7
agcctccagc agatgcaaga actc                                          24

<210> SEQ ID NO 8
<211> LENGTH: 24
<212> TYPE: DNA
<213> ORGANISM: Artificial Sequence
<220> FEATURE:
<223> OTHER INFORMATION: Description of Artificial Sequence: primer

<400> SEQUENCE: 8
ttgctccaca ttggaaggtt ccca                                          24

<210> SEQ ID NO 9
<211> LENGTH: 23
<212> TYPE: DNA
<213> ORGANISM: Artificial Sequence
<220> FEATURE:
<223> OTHER INFORMATION: Description of Artificial Sequence: primer

<400> SEQUENCE: 9
tcacaaagag atgatggagg aac                                           23

<210> SEQ ID NO 10
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 10
acatgcaggt gagttgtcag                                               20
```

<210> SEQ ID NO 11
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 11
atctgcactt cgtgtgcaag                                                  20

<210> SEQ ID NO 12
<211> LENGTH: 23
<212> TYPE: DNA
<213> ORGANISM: Artificial Sequence
<220> FEATURE:
<223> OTHER INFORMATION: Description of Artificial Sequence: primer

<400> SEQUENCE: 12
gagtctgagg atttccttag ctc                                              23

<210> SEQ ID NO 13
<211> LENGTH: 24
<212> TYPE: DNA
<213> ORGANISM: Artificial sequence
<220> FEATURE:
<223> OTHER INFORMATION: Description of Artificial Sequence: primer

<400> SEQUENCE: 13
ggtgattgct ggtcgtttgt tgtg                                             24

<210> SEQ ID NO 14
<211> LENGTH: 23
<212> TYPE: DNA
<213> ORGANISM: Artificial sequence
<220> FEATURE:
<223> OTHER INFORMATION: Description of Artificial Sequence: primer

<400> SEQUENCE: 14
gccgacatgc tcatgtacgt gtt                                              23

<210> SEQ ID NO 15
<211> LENGTH: 22
<212> TYPE: DNA
<213> ORGANISM: Artificial sequence
<220> FEATURE:
<223> OTHER INFORMATION: Description of Artificial Sequence: primer

<400> SEQUENCE: 15
actgagaagc atgacggaca ag                                               22

<210> SEQ ID NO 16
<211> LENGTH: 21
<212> TYPE: DNA
<213> ORGANISM: Artificial sequence
<220> FEATURE:
<223> OTHER INFORMATION: Description of Artificial Sequence: primer

<400> SEQUENCE: 16
aggtagcggt ccagactgat g                                                21

<210> SEQ ID NO 17
<211> LENGTH: 21
<212> TYPE: DNA
<213> ORGANISM: Artificial sequence
<220> FEATURE:

-continued

<223> OTHER INFORMATION: Description of Artificial Sequence: primer

<400> SEQUENCE: 17
cacccacagc catagaccta c                                             21

<210> SEQ ID NO 18
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 18
gtcagtccag gcaatgcttc                                               20

<210> SEQ ID NO 19
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 19
agccaagctg tctcagtgac                                               20

<210> SEQ ID NO 20
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 20
tctcccgact ttgttgaccg                                               20

<210> SEQ ID NO 21
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 21
gctgagccta atcctctgcc                                               20

<210> SEQ ID NO 22
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 22
actgctcact tccaagaccg                                               20

<210> SEQ ID NO 23
<211> LENGTH: 21
<212> TYPE: DNA
<213> ORGANISM: Artificial sequence
<220> FEATURE:
<223> OTHER INFORMATION: Description of Artificial Sequence: primer

<400> SEQUENCE: 23
aggaatggac ttgaaacaag g                                             21

```
<210> SEQ ID NO 24
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 24
gcaaagcttg ttgatcatgg                                                   20

<210> SEQ ID NO 25
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 25
aggcaggtcc aagcacttac                                                   20

<210> SEQ ID NO 26
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 26
ataactccgc cgtctgaagg                                                   20

<210> SEQ ID NO 27
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 27
tcaagcacca ctgtggactc                                                   20

<210> SEQ ID NO 28
<211> LENGTH: 20
<212> TYPE: DNA
<213> ORGANISM: Artificial sequence
<220> FEATURE:
<223> OTHER INFORMATION: Description of Artificial Sequence: primer

<400> SEQUENCE: 28
aggttccatg ctcccagaga                                                   20
```

METHOD FOR PRODUCING PLURIPOTENT STEM CELLS

TECHNICAL FIELD

The present invention relates to a method for producing pluripotent stem cells, and pluripotent stem cells. The present invention further relates to a method for monitoring an undifferentiated state of pluripotent stem cells. The present invention still further relates to a method for producing somatic cells.

Priority is claimed on Japanese Patent Application No. 2019-066844, filed Mar. 29, 2019, the content of which is incorporated herein by reference.

BACKGROUND ART

Pluripotent stem cells such as ES cells and iPS cells have an ability to grow indefinitely and an ability to differentiate into various types of somatic cells. The practical use of a therapeutic method for transplanting somatic cells obtained by inducing differentiation from pluripotent stem cells has a possibility of fundamentally revolutionizing a therapeutic method for intractable diseases and lifestyle-related diseases. For example, a technique of in vitro differentiation induction, from pluripotent stem cells, into nerve cells or a wide variety of somatic cells such as cardiac muscle cells, blood cells, and retinal cells is already under development.

Meanwhile, regenerative medicine using pluripotent stem cells still has problems in terms of practical use. Productivity of pluripotent stem cells is one example of the problems. For example, it is said that about $2 \times 10^{11}$ cells are required for liver regeneration. Methods for culturing pluripotent stem cells are roughly divided into adhesion culture in which cells are adhered on a flat substrate and cultured, and suspension culture in which cells are suspended in a liquid medium and cultured. In order to culture the above-mentioned number of cells by the adhesion culture, a substrate of $10^6$ cm$^2$ or larger is required, which is equivalent to about 20000 pieces of a general 10 cm dish. As described above, since the number of cells obtained depends on a culture area in the adhesion culture on a substrate surface, scaling up is difficult, and it is difficult to supply a required amount of cells for regenerative medicine. In the suspension culture, since cells are cultured while being suspended in a liquid medium, the number of cells obtained depends on a volume of the medium. Therefore, the suspension culture is easily scaled up and is suitable for mass production of cells. For example, Non Patent Document 1 discloses a method of performing suspension culture of pluripotent stem cells while stirring a liquid medium using a spinner flask as a cell culture container for the suspension culture.

Furthermore, productivity of target somatic cells is another example of problems of practical use of the regenerative medicine. Making efforts to improve differentiation induction efficiency is an exemplary example of making efforts to efficiently produce target somatic cells, and various methods thereof have been reported. For example, Non Patent Document 2 discloses a technique of efficiently inducing differentiation from human pluripotent stem cells into pancreatic R cells by using a plurality of additive factors at the time of inducing differentiation. Furthermore, Non Patent Document 3 discloses a method of selectively removing undifferentiation-deviated cells (cells lost pluripotency) in adhesion culture of pluripotent stem cells to enhance homogeneity of a pluripotent stem cell population as a starting material. Furthermore, Non Patent Document 4 discloses a method of inhibiting the appearance of undifferentiation-deviated cells in adhesion culture of pluripotent stem cells by adding a drug inhibiting secretion of WNT protein to reduce a concentration of the WNT protein in a medium.

CITATION LIST

Non Patent Documents

[Non Patent Document 1]
Olmer R. et al., Tissue Engineering: Part C, Volume 18 (10): 772-784 (2012)
[Non Patent Document 2]
Shigeharu G. Yabe et al., Journal of Diabetes, 2017 February; 9 (2): 168-179
[Non Patent Document 3]
Mee-Hae Kim. Et al., Scientific Reports, 2017 Mar. 7; 7 (1): 93.
[Non Patent Document 4]
Dorota Kurek et al., Stem Cell Reports, Vol. 4, 114-128, Jan. 13, 2015

SUMMARY OF INVENTION

Technical Problem

As described above, various methods for efficiently producing target somatic cells from pluripotent stem cells are under development. However, in the method of Non Patent Document 2, production costs for somatic cells tend to increase because additive factors used are expensive, and in the method of Non Patent Document 3, an yield of pluripotent stem cells obtained is reduced because undifferentiation-deviated cells are discarded.

Meanwhile, when the inventors of the present invention cultured pluripotent stem cells by adhesion culture and suspension culture, they found that undifferentiation-deviated cells appeared at a high frequency in the suspension culture despite the condition in which undifferentiation-deviated cells were not detected in the adhesion culture. As a result of analyzing a concentration of WNT protein contained in a medium in each of the culture methods, it was found that a concentration of WNT protein contained in a medium was high in the adhesion culture as compared to the suspension culture despite the condition in which undifferentiation-deviated cells were not detected in the adhesion culture, and it was found that this is a finding inconsistent with findings in Non Patent Document 4. That is, the inventors of the present invention found a problem in which the essential cause of the appearance of undifferentiation-deviated cells when culturing pluripotent stem cells is other than a concentration of WNT protein in a medium.

Solution to Problem

As a result of diligent studies to solve the above-described problem, the inventors of the present invention found that the appearance of undifferentiation-deviated cells can be inhibited and a homogeneous pluripotent stem cell population can be acquired by setting, to a value equal to or less than a predetermined value, an amount of WNT protein contained in a unit of a medium in contact with a unit area of a surface of a pluripotent stem cell in suspension culture of pluripotent stem cells, and therefore completed the present invention.

That is, according to the present invention, the following aspects are provided.

<1> A method for producing pluripotent stem cells, the method including a step of performing suspension culture of pluripotent stem cells under a condition in which an amount, which is calculated by the following Equation (1), of WNT protein contained in a unit of a medium in contact with a unit area of a cell surface of a pluripotent stem cell is maintained at $2.9 \times 10^2$ μg/mL·cm$^2$ or less.

(Amount of WNT protein contained in unit of medium in contact with unit area of cell surface)=(concentration of WNT protein in medium)/(surface area in contact with medium per cell)  (1)

<2> The method according to <1>, in which an amount of WNT protein in the medium per $10^4$ pluripotent stem cells is 1.0 pg/$10^4$ cells or less.

<3> The method according to <1> or <2>, in which the WNT protein is secreted from pluripotent stem cells.

<3A> The method according to any one of <1> to <3>, in which the WNT protein is WNT3A protein.

<4> The method according to any one of <1> to <3>, in which the medium contains at least one selected from the group consisting of L-ascorbic acid, insulin, transferrin, selenium, and sodium hydrogen carbonate.

<5> The method according to any one of <1> to <4>, in which the medium contains FGF2.

<5A> The method according to <5>, in which a concentration of the FGF2 in the medium is 50 ng/mL or less.

<5B> The method according to any one of <1> to <5A>, in which the medium contains a ROCK inhibitor.

<6> The method according to any one of <1> to <5>, in which the step of performing suspension culture includes a step of forming a cell aggregate.

<6A> The method according to any one of <1> to <6>, in which the step of performing suspension culture includes a step of culturing pluripotent stem cells in the presence of a WNT protein secretion inhibitor.

<6B> The method according to any one of <1> to <6A>, in which expression of Brachyury and SOX17 in a pluripotent stem cell is negative in the step of performing suspension culture.

<7> The method according to <6>, in which in the cell aggregate, a percentage of cells positive for OCT4 is 90% or more, a percentage of cells positive for SOX2 is 90% or more, and a percentage of cells positive for Nanog is 90% or more.

<8> The method according to any one of <1> to <7>, in which the pluripotent stem cells include at least one selected from the group consisting of ES cells and induced pluripotent stem cells.

<9> Pluripotent stem cells produced by the method according to any one of <1> to <8>.

<10> A method for monitoring an undifferentiated state of pluripotent stem cells using any one or more of the following conditions as an index:
a condition in which an amount, which is calculated by the following Equation (1), of WNT protein contained in a unit of a medium in contact with a unit area of a cell surface of a pluripotent stem cell is $2.9 \times 10^2$ μg/mL·cm$^2$ or less, and
a condition in which an amount of WNT protein in the medium per $10^4$ pluripotent stem cells is 1.0 pg/$10^4$ cells or less.

(Amount of WNT protein contained in unit of medium in contact with unit area of cell surface)=(concentration of WNT protein in medium)/(surface area in contact with medium per cell)  (1)

<11> A production method for somatic cells, the method including:
a step of producing pluripotent stem cells by the method according to any one of <1> to <8>; and
a step of culturing the pluripotent stem cells in the presence of a differentiation-inducing factor.

<12> The production method according to <11>, in which the somatic cells are selected from the group consisting of endoderm cells, mesoderm cells, and ectoderm cells.

<13> The production method according to <11>, in which the somatic cells are at least one selected from the group consisting of cardiac muscle cells, skeletal muscle cells, nerve cells, megakaryocytes, hematopoietic stem cells, airway epithelial cells, germ cells, dendritic cells, eosinophils, mast cells, cartilage cells, T cells, erythropoietin-producing cells, intestinal epithelium, pancreatic cells, liver cells, alveolar epithelial cells, and kidney cells.

Advantageous Effects of Invention

According to the present invention, a homogeneous pluripotent stem cell population can be obtained, and differentiation induction can be efficiently performed.

DESCRIPTION OF EMBODIMENTS

[Method for Producing Pluripotent Stem Cells]

Figure 1:
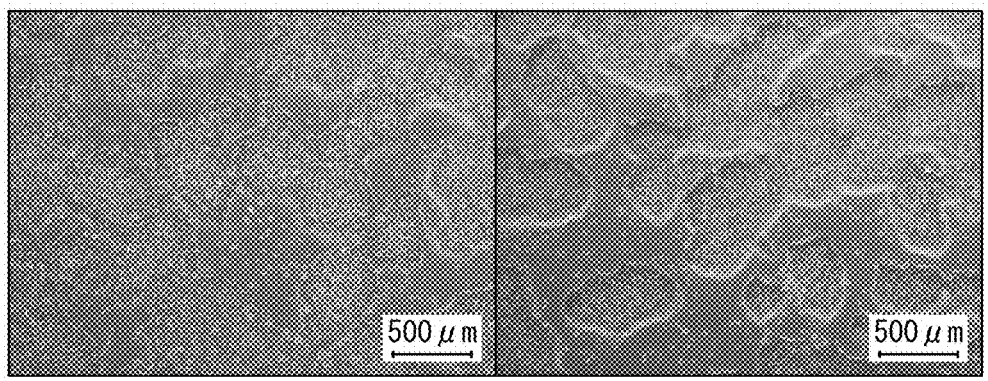
FIG. 1 shows phase-contrast images of day 5 and day 10 of adhesion culture of a human iPS cell line 201B7.

A method for producing pluripotent stem cells according to the present invention includes a step of performing suspension culture of pluripotent stem cells under a condition in which a concentration of WNT protein contained in a medium in contact with a unit area of a cell surface of a pluripotent stem cell is maintained at $2.9 \times 10^2$ (g/mL)/cm$^2$ or less. The concentration of WNT protein contained in a medium in contact with a unit area of a cell surface of a pluripotent stem cell can be said to be an amount of WNT protein contained in a unit of a medium in contact with a unit area of a cell surface of a pluripotent stem cell. Accordingly, the present invention also provides a method including a step of performing suspension culture of pluripotent stem cells under a condition in which an amount of WNT protein contained in a unit of a medium in contact with a unit area of a cell surface of a pluripotent stem cell is maintained at $2.9 \times 10^2$ µg/mL·cm$^2$ or less.

(Pluripotent Stem Cells)

Pluripotent stem cells refer to cells which have multilineage potential (pluripotency) capable of differentiating into all kinds of cells constituting the biological body and refer to cells which can continue to grow indefinitely while maintaining their pluripotency in in vitro culture under appropriate conditions. Specific examples thereof include, but are not limited to, embryonic stem cells (ES cells), pluripotent stem cells derived from fetal primordial germ cells (EG cells: Proc Natl Acad Sci USA. 1998, 95: 13726-31), pluripotent stem cells derived from testicles (GS cells: Nature. 2008, 456: 344-9), induced pluripotent stem cells (IPS cells), human somatic stem cells (tissue stem cells), and the like. Pluripotent stem cells used in the present invention are preferably iPS cells or ES cells, and more preferably iPS cells.

Examples of pluripotent stem cells in the present invention include a single cell, and a cell population consisting of a plurality of cells. The cell population may form a cell aggregate that is one mass-like cell population by three-dimensional aggregation of a plurality of cells. The cell aggregate will be described later.

As ES cells, it is possible to use cells derived from any warm-blooded animal, preferably mammals. Examples of mammals include mice, rats, guinea pigs, hamsters, rabbits, cats, dogs, sheep, pigs, cattle, horses, goats, monkeys, or humans. Cells derived from humans can be preferably used.

Specific examples of ES cells include ES cells of mammals or the like which are established by culturing preimplantation early embryos, ES cells established by culturing early embryos produced by nuclear transplantation of nuclei of somatic cells, and ES cells in which genes on the chromosomes of these ES cells are modified using genetic engineering techniques. Each of the ES cells can be prepared according to a method generally performed in the field or a known document. ES cells of mice are established by Evans et al. in 1981 (Evans et al., 1981, Nature 292: 154-6) and Martin et al. (Martin G R. et al., 1981, Proc Natl Acad Sci 78: 7634-8). ES cells of humans are established by Thomson et al. in 1998 (Thomson et al., Science, 1998, 282: 1145-7). The cells are available from WiCell Research Institute (website: wicell.org, Madison, Wisconsin, United States), National Institute of Health, Kyoto University, and the like, and can be purchased from, for example, Cellartis (website: cellartis.com, Sweden).

Induced pluripotent stem cells (iPS cells) are cultured cells to which pluripotency has been imparted after reprogramming somatic cells into an undifferentiated state by introducing a reprogramming factor into the somatic cells. The production of iPS cells has been successful by a plurality of groups including a group of a Professor Shinya Yamanaka at Kyoto University, a group of Rudolf Jaenisch et al. at the Massachusetts Institute of Technology, a group of James Thomson et al. at the University of Wisconsin, a group of Konrad Hochedlinger et al. at Harvard University, and the like. For example, PCT International Publication No. WO2007/069666 discloses somatic cell nuclear reprogramming factors including gene products of Oct family genes, Klf family genes, and Myc family genes, and somatic cell nuclear reprogramming factors including gene products of Oct family genes, Klf family genes, Sox family genes, and Myc family genes; and further discloses a method for producing induced pluripotent stem cells by nuclear reprogramming of somatic cells, the method including a step of bringing the above-mentioned nuclear reprogramming factors into contact with somatic cells.

The type of somatic cell used for producing iPS cell is not particularly limited, and any somatic cell can be used. That is, somatic cells include all cells other than germ cells among the cells constituting the biological body, and may be differentiated somatic cells or undifferentiated stem cells. The origin of somatic cells is not particularly limited and may be any of mammals, birds, fish, reptiles, and amphibians, but the origin is preferably mammals (for example, rodents such as mice, or primates such as humans) and is particularly preferably mice or humans. Furthermore, when human somatic cells are used, somatic cells of any of fetuses, newborn infants, or adults may be used. Specific examples of somatic cells include fibroblasts (such as dermal fibroblasts), epithelial cells (such as gastric epithelial cells, hepatic epithelial cells, and alveolar epithelial cells), endothelial cells (such as blood vessels and lymph vessels), nerve cells (such as neurons and glial cells), pancreatic cells, white blood cells (B cells, T cells, and the like), bone marrow cells, muscle cells (for example, skeletal muscle cells, smooth muscle cells, and cardiac muscle cells), hepatic parenchymal cells, non-hepatic parenchymal cells, fat cells, osteoblasts, cells constituting periodontal tissues (such as periodontal ligament cells, cementoblasts, gingival fibroblasts, and osteoblasts), cells constituting the kidneys, eyes, and ears, and the like.

Cells used in the present invention may be cells derived from any animal. For example, cells may be derived from rodents such as mice, rats, and hamsters; primates such as humans, gorillas, and chimpanzees; and mammals such as domestic animals or pet animals such as dogs, cats, rabbits, cattle, horses, sheep, and goats, but cells derived from humans are particularly preferable.

iPS cells are stem cells having a long-term self-renewal ability under predetermined culture conditions (for example, conditions for culturing ES cells), and having multilineage potential into ectoderm, mesoderm, or endoderm under predetermined differentiation induction conditions. Furthermore, iPS cells may be stem cells having an ability to form a teratoma when being transplanted into a test animal such as a mouse.

In order to produce iPS cells from somatic cells, first, at least one or more of reprogramming genes is introduced into somatic cells. A reprogramming gene is a gene encoding a reprogramming factor having an action of reprogramming somatic cells into iPS cells. Specific examples of combinations of reprogramming genes include, but are not limited to, the following combinations.

(i) Oct gene, Klf gene, Sox gene, Myc gene
(ii) Oct gene, Sox gene, NANOG gene, LIN28 gene
(iii) Oct gene, Klf gene, Sox gene, Myc gene, hTERT gene, SV40 large T gene
(iv) Oct gene, Klf gene, Sox gene In addition to the above combinations, a method of further reducing transgenes (Nature. 2008 Jul. 31; 454 (7204): 646-50), a method using low-molecular-weight compounds (Cell Stem Cell. 2009 Jan. 9; 4 (1): 16-9, Cell Stem Cell. 2009 Nov. 6; 5 (5): 491-503), a method using transcription factor proteins instead of genes (Cell Stem Cell. 2009 May 8; 4 (5): 381-4), and the like have been reported. iPS cells may be iPS cells produced by any method.

A form of introducing reprogramming factors into cells is not particularly limited, and examples thereof include gene introduction using a plasmid, introduction of synthetic RNA, direct introduction as a protein, and the like. Furthermore, iPS cells, which are produced by a method using microRNA or RNA, low-molecular-weight compounds, or the like, may be used. As pluripotent stem cells including ES cells and iPS cells, commercially available cells or distributed cells may be used, or newly produced cells may be used.

As iPS cells, it is possible to use, for example, cell lines 253G1, 253G4, 201B6, 201B7, 409B2, 454E2, 606A1, 610B1, 648A1, 1201C1, 1205D1, 1210B2, 1231A3, 1383D2, 1383D6, iPS-TIG120-3f7, iPS-TIG120-4f1, iPS-TIG114-4f1, RPChiPS771-2, 15M63, 15M66, HiPS-RIKEN-1A, HiPS-RIKEN-2A, HiPS-RIKEN-12A, Nips-B2, TkDN4-M, TkDA3-1, TkDA3-2, TkDA3-4, TkDA3-5, TkDA3-9, TkDA3-20, hiPSC38-2, MSC-iPSC1, BJ-iPSC1, and the like.

As ES cells, it is possible to use, for example, cell lines KhES-1, KhES-2, KhES-3, KhES-4, KhES-5, SEES1, SEES2, SEES3, HUES8, CyT49, H1, H9, HS-181, and the like. Newly produced clinical grade iPS cells or ES cells may be used.

Examples of pluripotent stem cells in the present invention include a single cell, and a plurality of cells or a cell population consisting of a plurality of cells. The cell population may form a cell aggregate, which is one mass, by adhesion or the like of a plurality of cells to each other.

(WNT Protein)

Wingless-type MMTV integration site family (WNT) proteins are proteins involved in WNT signaling pathways. WNT proteins bind to a seven-pass transmembrane receptor Frizzled (Fz), a single-pass transmembrane receptor LRP5/6 that functions as a coupled receptor (low-density lipoprotein receptor-related protein 5/6), and Ror or RYK which are single-pass transmembrane receptors having the tyrosine kinase activity; and activates three kinds of pathways including a β-catenin pathway, a planar cell polarity (PCP) pathway, and a calcium pathway. The β-catenin pathway adjusts a protein level of β-catenin that functions as a transactivation promoter, and thereby controls signal transduction and controls cell growth and differentiation. WNT proteins are synthesized in the ribosome, undergo asparagine-bound sugar chain modification in the endoplasmic reticulum and lipid modification of palmitic acid by porcupine which is a membrane-bound acyltransferase, and are extracellularly secreted from the Golgi apparatus.

19 types of human WNT proteins have been identified (WNT1, WNT2, WNT2B, WNT3, WNT3A, WNT4, WNT5A, WNT5B, WNT6, WNT7A, WNT7B, WNT8A, WNT8B, WNT9A, WNT9B, WNT10A, WNT10B, WNT11, and WNT16).

As described above, the WNT signaling pathways include the β-catenin pathway that induces gene expression through stabilization of β-catenin by binding to a WNT receptor on a cell surface, the PCP pathway that activates JNK and Rho kinases, and the calcium ($Ca^{2+}$) pathway that activates PKC and the like. WNT protein in the present invention may be a protein involved in any of the pathways, but it is preferably a protein involved in the (3-catenin pathway. WNT1, WNT2, WNT3, WNT3A, WNT7A, WNT7B, WNT10A, WNT10B, and the like are preferable. As the WNT protein, a WNT3A protein is particularly preferable. Examples of genetic sequences and amino acid sequences of human WNT3A (GENE ID: 89780) include sequences registered as NCBI RefSeq: NM_033131.4 and NP_149122.1, and the like.

In the present invention, a concentration of WNT protein contained in a medium in contact with a unit area of a cell surface of a pluripotent stem cell is a concentration of WNT protein contained in a medium in contact with a unit area of a cell surface of a single pluripotent stem cell (single cell). In other words, the concentration is an amount of WNT protein contained in a unit of a medium in contact with a unit area of a cell surface of a pluripotent stem cell, and is an amount of WNT protein contained in a unit of a medium in contact with a unit area of a cell surface of a single pluripotent stem cell (single cell).

The amount of WNT protein contained in a unit of a medium in contact with a unit area of a cell surface of a pluripotent stem cell is not particularly limited as long as it is $2.9 \times 10^2$ µg/mL·cm² or less, but an upper limit is preferably, for example, $2.8 \times 10^2$ µg/mL·cm² or less, $2.7 \times 10^2$ µg/mL·cm² or less, $2.6 \times 10^2$ µg/mL·cm² or less, $2.5 \times 10^2$ µg/mL·cm² or less, $2.4 \times 10^2$ µg/mL·cm² or less, $2.3 \times 10^2$ µg/mL·cm² or less, $2.2 \times 10^2$ µg/mL·cm² or less, $2.1 \times 10^2$ µg/mL·cm² or less, $2.0 \times 10^2$ µg/mL·cm² or less, $1.9 \times 10^2$ µg/mL·cm² or less, $1.8 \times 10^2$ g/mL cm² or less, $1.7 \times 10^2$ µg/mL·cm² or less, $1.6 \times 10^2$ µg/mL·cm² or less, $1.5 \times 10^2$ g/mL cm² or less, $1.4 \times 10^2$ µg/mL·cm² or less, $1.3 \times 10^2$ µg/mL·cm² or less, $1.2 \times 10^2$ g/mL cm² or less, $1.1 \times 10^2$ µg/mL·cm² or less, $1.0 \times 10^2$ µg/mL·cm² or less, 90 µg/mL cm² or less, 80 µg/mL cm² or less, 70 µg/mL cm² or less, 60 µg/mL cm² or less, 50 µg/mL cm² or less, 40 µg/mL cm² or less, 30 µg/mL cm² or less, 20 µg/mL cm² or less, 10 µg/mL cm² or less, 1 µg/mL cm² or less, or 0.1 µg/mL cm² or less. A lower limit of the concentration of WNT protein is preferably, for example, 0 µg/mL cm² or more, $1.0 \times 10^{-5}$ µg/mL cm² or more, $1.0 \times 10^{-4}$ µg/mL cm² or more, $1.0 \times 10^{-3}$ µg/mL cm² or more, or $1.0 \times 10^{-2}$ µg/mL·cm² or more.

An amount of WNT protein contained in a unit of a medium in contact with a unit area of a cell surface can be calculated by Equation (1).

(Amount of WNT protein contained in unit of medium in contact with unit area of cell surface)=(concentration of WNT protein in medium)/(surface area in contact with medium per cell)     (1)

In Equation (1), the "surface area in contact with medium per cell" can be calculated from a volume of a cell aggregate and from the number of cells contained in one cell aggregate by the following equation.

(Volume of cell aggregate)=$4/3 \times \pi \times$(pi)$\times$((diameter of cell aggregate)/2)$^3$ (Volume of one cell)=(volume of cell aggregate)/ (number of cells contained in one cell aggregate)

(Diameter of one cell)=$2\times(3/(4\times7)\times$(volume of one cell))$^{1/3}$ (Surface area in contact with medium per cell)=$4\times \pi \times$((diameter of one cell)/2)$^2$ In Equation (1) above, the "concentration of WNT protein in medium" can be acquired by collecting a culture supernatant and measuring a concentration of WNT protein by a conventional method. For example, ELISA or the like can be used for measuring a concentration of WNT protein in a medium. The "concentration of WNT protein in medium" is preferably a concentration of WNT3A protein measured by ELISA using an anti-WNT3A antibody. As a sample for ELISA, a medium supernatant can be used. A commercially available ELISA kit for WNT3A may be used for the measurement.

Specific examples include the following method.

A diameter of a cell aggregate can be measured by acquiring an image of the cell aggregate using a phase-contrast microscope and analyzing it with image analysis software (for example, ImageJ). Next, the number of cells contained in one cell aggregate is calculated from the diameter of the cell aggregate based on a relational expression between the diameter of the cell aggregate and the number of cells contained in one cell aggregate. Next, assuming that the cell aggregate is a sphere, a volume of the cell aggregate can be calculated from the diameter of the cell aggregate. Furthermore, assuming that a filling rate of cells contained in the cell aggregate is 100%, a volume of one cell can be calculated from the volume of the cell aggregate and the number of cells contained in the one cell aggregate. Then, assuming that the cells contained in the cell aggregate are spheres, a diameter of one cell is calculated from the volume of the one cell, a surface area of one cell is calculated from the diameter of the one cell, and this surface area can be a surface area in contact with a medium per cell. An amount of WNT protein contained in a unit of a medium in contact with a unit area of a cell surface can be calculated from the concentration of WNT protein which is contained in the medium and is measured by a conventional method such as ELISA and from the surface area in contact with the medium per cell.

Furthermore, the relational expression between the diameter of one cell aggregate and the number of cells contained in the one cell aggregate can be derived by the following method. By performing suspension culture under a plurality of culture conditions with different composition of cell lines and medium additives, images of cell aggregates are acquired using a phase-contrast microscope. By analyzing the images with image analysis software (for example, ImageJ), diameters of ten cell aggregates for each of the conditions are measured. Then, an average value of the diameters of the ten cell aggregates is calculated can be used as an average diameter of the cell aggregates under each of the conditions. Furthermore, the number of cell aggregates in a culture solution can be measured by phase-contrast microscope observation. Then, by recovering the cell aggregates and the culture supernatant in a centrifuge tube and leaving them to stand for about 5 minutes to precipitate the cell aggregates and remove the culture supernatant, adding 1 mL of Accutase to the cell aggregates, and performing treatment for 10 minutes, the cell aggregates can be dispersed into single cells by pipetting. By suspending these cells in a medium and staining a part of them with trypan blue, the number of living cells in the culture solution can be measured. The number of cells (cells/aggregate) contained in one cell aggregate can be calculated from the number of the cell aggregates and the number of the living cells according to Equation (2).

(Number of cells contained in one cell aggregate)= (number of living cells)/(number of cell aggregates)     (2)

Furthermore, by plotting the average diameter of the cell aggregates and the number of cells contained in one cell aggregate on a graph, and creating an approximate curve by a quadratic approximation, it is possible to obtain an approximate expression that expresses the relationship between the diameter of the cell aggregates and the number of cells contained in one cell aggregate. An example of the approximate expression obtained by the above-described method is shown below.

(Number of cells contained in one cell aggregate)=$0.111\times$(diameter of cell aggregates)$^2$$-0.9585\times$(diameter of cell aggregates)

The number of cells contained in one cell aggregate may be calculated from the number of cell aggregates and the number of living cells by Equation (2) above, or may be calculated from the average diameter of cell aggregates by obtaining the above approximate expression. By obtaining the approximate expression, it is possible to calculate the number of cells contained in one cell aggregate only from the average diameter of cell aggregates.

In the present invention, pluripotent stem cells may be cultured under a condition in which an amount of WNT protein in the medium per $10^4$ pluripotent stem cells is 1.0 pg/$10^4$ cells or less. The amount of WNT protein in the medium per $10^4$ pluripotent stem cells (pg/$10^4$ cells) can be calculated according to the following equation.

(Amount of WNT protein per $10^4$ pluripotent stem cells (pg/$10^4$ cells))=(concentration of WNT protein in medium (pg/mL))/(density of living cells in medium (cells/mL))$\times 10^4$ The amount of WNT protein in the medium per $10^4$ pluripotent stem cells is not particularly limited as long as it is 1.0 pg/$10^4$ cells or less, but an upper limit is preferably, for example, $9.0\times10^{-1}$ pg/$10^4$ cells or less, $8.0\times10^{-1}$ pg/$10^4$ cells or less, $7.0\times10^{-1}$ pg/$10^4$ cells or less, $6.8\times10^{-1}$ pg/$10^4$ cells or less, $6.0\times10^{-1}$ pg/$10^4$ cells or less, $5.0\times10^{-1}$ pg/$10^4$ cells or less, $4.0\times10^{-1}$ pg/$10^4$ cells or less, $3.2\times10^{-1}$ pg/$10^4$ cells or less, $3.0\times10^{-1}$ pg/$10^4$ cells or less, $2.0\times10^{-1}$ pg/$10^4$ cells or less, $1.0\times10^{-1}$ pg/$10^4$ cells or less, $9.0\times10^{-2}$ pg/$10^4$ cells or less, $8.0\times10^{-2}$ pg/$10^4$ cells or less, $7.0\times10^{-2}$ pg/$10^4$ cells or less, $6.0\times10^{-2}$ pg/$10^4$ cells or less, or $5.0\times10^{-2}$ pg/$10^4$ cells or less. A lower limit of the amount of WNT protein is preferably, for example, $1.0\times10^{-4}$ pg/$10^4$ cells or more, $1.0\times10^{-3}$ pg/$10^4$ cells or more, or $1.0\times10^{-2}$ pg/$10^4$ cells or more.

Furthermore, WNT protein in a medium may be secreted from pluripotent stem cells. An amount of WNT protein in a medium is an amount of WNT protein present in a medium. When WNT protein is not added to a medium from the outside, an amount of WNT protein in a medium is derived from WNT protein secreted from pluripotent stem cells. The WNT protein is preferably WNT3A protein.

In the present invention, pluripotent stem cells may be cultured under a condition in which an amount of WNT protein extracellularly secreted from pluripotent stem cells is reduced.

The condition in which an amount of WNT protein extracellularly secreted from pluripotent stem cells is reduced is, for example, a condition in which a concentration of WNT protein contained in a medium is maintained at 100 µg/mL or less. An upper limit of the concentration of WNT protein contained in a medium is preferably, for example, 90 µg/mL or less, 84 µg/mL or less, 80 µg/mL or less, 70 µg/mL or less, 60 µg/mL or less, 54 µg/mL or less, 50 µg/mL or less, 40 µg/mL or less, 30 µg/mL or less, 20 µg/mL or less, or 10 µg/mL or less, and a lower limit thereof is preferably, for example, 0.1 pg/mL or more, or 1 µg/mL or more.

In the present invention, a method for satisfying the above-described condition, that is, any one or more of the following conditions is not particularly limited:
 a condition in which an amount of WNT protein contained in a unit of a medium in contact with a unit area of a cell surface of a pluripotent stem cell is $2.9 \times 10^2$ µg/mL·cm$^2$ or less (hereinafter sometimes referred to as a "condition 1"); and
 a condition in which an amount of WNT protein in the medium per $10^4$ pluripotent stem cells is 1.0 pg/$10^4$ cells or less (hereinafter sometimes referred to as a "condition 2").

Examples of such methods include a method of adding a WNT protein secretion inhibitor, a method of inhibiting secretion of WNT protein by genetic recombination, a method of adjusting a frequency of medium exchange to remove WNT protein contained in a medium, a method of feeding a medium to dilute WNT protein contained in a medium, and the like. In the present invention, a method of adding a WNT protein secretion inhibitor is preferable.

In the present invention, it is possible to monitor an undifferentiated state of pluripotent stem cells by using the above-described condition, that is, any one or more of the following conditions as an index:
 a condition in which an amount of WNT protein contained in a unit of a medium in contact with a unit area of a cell surface of a pluripotent stem cell is $2.9 \times 10^2$ µg/mL·cm$^2$ or less (condition 1); and
 a condition in which an amount of WNT protein in the medium per $10^4$ pluripotent stem cells is 1.0 pg/$10^4$ cells or less (condition 2).

That is, when any one or more of the above indexes are satisfied, it can be determined that an undifferentiated state of pluripotent stem cells is maintained. An amount of WNT protein in a medium can be quantitatively determined by a conventional method such as ELISA.

(Maintenance Culture)

In the present invention, pluripotent stem cells before performing suspension culture are preferably pluripotent stem cells in which an undifferentiated state is maintained by using an undifferentiation maintenance medium. A culture in which an undifferentiated state of pluripotent stem cells is maintained by using an undifferentiation maintenance medium is also referred to as maintenance culture of pluripotent stem cells.

The undifferentiation maintenance medium is not particularly limited as long as it can maintain an undifferentiated state of pluripotent stem cells. Examples of undifferentiation maintenance media include a medium containing one or more selected from the group consisting of a Basic fibroblast growth factor-2 (FGF2), a Transforming growth factor-β1 (TGF-β1), Activin A, IGF-1, MCP-1, IL-6, PAI, PEDF, IGFBP-2, a Leukemia inhibitory factor (LIF), and IGFBP-7; and the like. The factors exemplified above are known to have a property of maintaining an undifferentiated state of pluripotent stem cells. As the undifferentiation maintenance medium, it is possible to use, for example, StemFit™ (for example, StemFit™ AK02N and the like) (Ajinomoto Co., Inc.), an Essential 8 medium (Life Technologies Japan Ltd.) (Thermo Fisher Scientific K.K.), STEMPRO™ hESC SFM (Life Technologies Japan Ltd.), mTeSR1 (VERITAS Corporation), TeSR2 (VERITAS Corporation), and the like, but examples are not limited thereto. Furthermore, into the undifferentiation maintenance medium, an antibiotic such as penicillin, streptomycin, and amphotericin B may be added, or a ROCK inhibitor such as CultureSure Y-27632 (FUJIFILM Wako Pure Chemical Corporation) may be added.

The maintenance culture of pluripotent stem cells can be performed on a cell culture dish coated with a cell adhesion protein such as vitronectin, fibronectin, laminin, or matrigel, using the above-mentioned undifferentiation maintenance medium.

A culture temperature in the maintenance culture of pluripotent stem cells is not particularly limited, but it is preferably from 36.0° C. to 38.0° C., and more preferably from 36.5° C. to 37.5° C. A culture period is not particularly limited, but it is preferably 1 day to 14 days. The maintenance culture of pluripotent stem cells may be performed, for example, every 1 day to 7 days, every 2 days to 5 days, every 3 days to 5 days, and every 3 days to 4 days, while passaging cells. The number of passages in the maintenance culture is not particularly limited. It is preferable to perform culture at an atmospheric $CO_2$ concentration of about 1% to 10%, preferably 5%, using a $CO_2$ incubator or the like.

When performing the maintenance culture of pluripotent stem cells, it is preferable to perform medium exchange at an appropriate frequency. A frequency of medium exchange is not particularly limited, and a frequency of medium exchange can be appropriately adjusted depending on the cell type and culture conditions. A medium exchange operation can be performed at a frequency of, for example, preferably one time or more every 5 days, one time or more every 4 days, one time or more every 3 days, one time or more every 2 days, or one time or more every 1 day. As a liquid medium used for the medium exchange, the same liquid medium as described above can be used. A method for medium exchange is not particularly limited. For example, preferably, maintenance culture can be continued by removing a supernatant by suction from a culture container with an aspirator, a pipette, or the like, thereafter, gently adding a fresh liquid medium, and thereafter, returning the culture container again to a culture environment such as a $CO_2$ incubator.

A passage method is not particularly limited. For example, preferably, it is possible to perform removing of a supernatant by suction from a culture container with an aspirator, a pipette, or the like, and thereafter washing if necessary. As a washing liquid, it is sufficient to use a buffer (including a PBS buffer), physiological saline, or a liquid medium (preferably a basal medium). For washed cells, the cells may be released by, for example, a mechanical, chemical, or biological method. For continuing the maintenance culture, the cells may be seeded in a fresh medium and a fresh culture container, which are for maintenance culture, and the maintenance culture may be continued. As a liquid medium and culture conditions used for the maintenance culture after passage, it is possible to use the same undifferentiation maintenance medium and conditions as described above. Furthermore, when releasing, cells may be released from a culture substrate or cells may be released from each other by using EDTA, TryPLE™ Select, Accutase™, collagenase, DISPASE, trypsin, trypsin/EDTA, trypsin/collagenase, ReLeSR™, or the like as a cell releasing solution; or cells may be released from a culture substrate using a cell scraper or the like. Released cells may be sufficiently dispersed and isolated by pipetting or using a strainer, or may be seeded in a colony form without being dispersed.

In the present invention, it is possible to use cells isolated after maintenance culture. The "isolated cells" referred to herein are cells obtained when cells, which are a plurality of cells adhered as a group, are released and dispersed. Isolation is a step of releasing and dispersing into, single cells, cells in a state of adhering to a culture container, a culture carrier, or the like or a cell population in which cells are in a state of adhering to each other. The cell population to be isolated may be in a state of being suspended in a liquid medium. A method of isolation is not particularly limited. For example, by the same method as the passage method in the above-described maintenance culture, it is possible to perform removing of a supernatant by suction from a culture container with an aspirator, a pipette, or the like, and thereafter washing if necessary. As a washing liquid, it is sufficient to use a buffer (including a PBS buffer), physiological saline, or a liquid medium (preferably a basal medium). For washed cells, the cells are released by, for example, a mechanical, chemical, or biological method. For the release, it is possible to suitably use a release agent (cell release enzyme such as trypsin or collagenase), a chelating agent such as ethylenediaminetetraacetic acid (EDTA), a mixture of the release agent and the chelating agent, and the like. The release agent is not particularly limited, and examples thereof include trypsin, Accutase™, TrypLE™ Express Enzyme (Life Technologies Japan Ltd.), TrypLE™ Select Enzyme (Life Technologies Japan Ltd.), DISPASE™, collagenase, ReLeSR™ (STEMCELL Technologies Inc.), and the like. Isolation can also be suitably performed by pipetting in combination with a release agent. Furthermore, isolation can also be suitably performed by causing cells to pass through a strainer. In the present invention, it is also possible to suitably use cells cryopreserved after isolation.

(Suspension Culture)

In the present invention, pluripotent stem cells are suspension-cultured in a medium under any of the above-described condition 1 and condition 2 or a condition satisfying both of the conditions. For example, pluripotent stem cells are suspension-cultured in a medium under a condition in which an amount of WNT protein extracellularly secreted from pluripotent stem cells is reduced. Suspension culture is to culture cells in a state of being non-adherent to a culture container such as a culture dish. The form of suspension culture is not particularly limited as long as cells are cultured in a state of being non-adherent to a culture container. For example, cells adhered to a microcarrier or the like may be cultured, or suspension culture may be performed in the form of a cell aggregate in which a plurality of cells are adhered to each other to form a single mass as will be described later. Furthermore, a polymer such as collagen can be mixed into the cell aggregate. Suspension culture, in which cells are cultured while being suspended in a liquid medium as described above, is easily scaled up, and thus is expected to be suitable for mass production of cells.

A medium in the suspension culture is not particularly limited as long as it can maintain an undifferentiated state of pluripotent stem cells. Examples thereof include a medium containing, in a basal medium, one or more selected from the group consisting of a Basic fibroblast growth factor-2 (FGF2), a Transforming growth factor-β1 (TGF-β1), Activin A, IGF-1, MCP-1, IL-6, PAI, PEDF, IGFBP-2, a Leukemia inhibitory factor (LIF), and IGFBP-7; and the like. The factors exemplified above are known to have a property of maintaining an undifferentiated state of pluripotent stem cells. As the medium in the suspension culture, it is possible to use, for example, StemFit™ (for example, StemFit™ AK02N and the like) (Ajinomoto Co., Inc.), an Essential 8 medium (Life Technologies Japan Ltd.) (Thermo Fisher Scientific K.K.), STEMPRO™ hESC SFM (Life Technologies Japan Ltd.), mTeSR1 (VERITAS Corporation), TeSR2 (VERITAS Corporation), and the like, but examples are not limited thereto.

Furthermore, into the medium in the suspension culture, an antibiotic such as penicillin, streptomycin, and amphotericin B may be added. Furthermore, the medium in the suspension culture may contain at least one selected from the group consisting of L-ascorbic acid, insulin, transferrin, selenium, and sodium hydrogen carbonate, or may contain all of L-ascorbic acid, insulin, transferrin, selenium, and sodium hydrogen carbonate. The medium in the suspension culture may contain components such as fatty acids or lipids, amino acids (for example, non-essential amino acids), vitamins, cytokines, antioxidant agents, 2-mercaptoethanol, pyruvic acid, buffering agents, inorganic salts, and phosphorylation enzyme inhibitors.

The medium in the suspension culture may contain FGF2. When the medium in the suspension culture contains FGF2, an upper limit of a concentration of FGF2 is preferably, for example, 100 ng/mL or less, 90 ng/mL or less, 80 ng/mL or less, 70 ng/mL or less, 60 ng/mL or less, 50 ng/mL or less, 40 ng/mL or less, 30 ng/mL or less, 20 ng/mL or less, 10 ng/mL or less, 9 ng/mL or less, 8 ng/mL or less, 7 ng/mL or less, 6 ng/mL or less, 5 ng/mL or less, 4 ng/mL or less, 3 ng/mL or less, 2 ng/mL or less, or 1 ng/mL or less. Furthermore, a lower limit is preferably 0.1 ng/mL or more. By culturing in the presence of FGF2, it is possible to maintain an undifferentiated state of pluripotent stem cells, and to promote cell growth.

The medium in the suspension culture may contain a Rho-associated kinase (ROCK; Rho-binding kinase) inhibitor as a phosphorylation enzyme inhibitor. A ROCK inhibitor is defined as a substance inhibiting the kinase activity of Rho-kinase (Rho-associated protein kinase: ROCK). Examples thereof include Y-27632 (4-[(1R)-1-aminoethyl]-N-pyridin-4-ylcyclohexane-1-carboxamide) or dihydrochloride thereof (refer to, for example, Ishizaki et al., Mol. Pharmacol. 57, 976-983 (2000); Narumiya et al., Methods Enzymol. 325, 273-284 (2000)), Fasudil/HA1077 (1-(5-isoquinolinesulfonyl)homopiperazine) or dihydrochloride thereof (refer to, for example, Uenata et al., Nature 389: 990-994 (1997)), H-1152 ((S)-(+)-2-methyl-1-[(4-methyl-5-isoquinolinyl)sulfonyl]-hexahydro-1H-1,4-diazepine) or dihydrochloride thereof (refer to, for example, Sasaki et al., Pharmacol. Ther. 93: 225-232 (2002)), Wf-536 ((+)-(R)-4-(1-aminoethyl)-N-(4-pyridyl)benzamide monochloride) (refer to, for example, Nakajima et al., CancerChemother. Pharmacol. 52 (4): 319-324 (2003)), and derivatives of them; and antisense nucleic acids against ROCK, RNA interference-inducible nucleic acids (for example, siRNA), dominant negative mutants, and expression vectors of them. Furthermore, other low-molecular-weight compounds are also known as ROCK inhibitors, and therefore such compounds or derivatives thereof can also be used in the present invention (for example, refer to United States Patent Application, Publication No. 20050209261, United States Patent Application, Publication No. 20050192304, United States Patent Application, Publication No. 20040014755, United States Patent Application, Publication No. 20040002508, United States Patent Application, Publication No. 20040002507, United States Patent Application, Publication No. 20030125344, United States Patent Application, Publication No. 20030087919, PCT International Publication No. WO2003/062227, PCT International Publication No. WO2003/059913, PCT International Publication No. WO2003/062225, PCT International Publication No. WO2002/076976, and PCT International Publication No. WO2004/039796). At least one ROCK inhibitor can be used in the present invention. By culturing in the presence of a ROCK inhibitor, it is possible to promote formation and growth of cell aggregates (spheroids) of pluripotent stem cells.

When the medium contains a ROCK inhibitor such as Y-27632, a lower limit of a concentration of the ROCK inhibitor is preferably, for example, 0.1 µM or more, 0.2 µM or more, 0.5 µM or more, 1 µM or more, 2 µM or more, 3 µM or more, 4 µM or more, 5 µM or more, 6 µM or more, 7 µM or more, 8 µM or more, 9 µM or more, or 10 µM or more. An upper limit of the concentration is not particularly limited as long as it is within a range not causing cell death. The upper limit is preferably, for example, 200 µM or less, 150 µM or less, 100 µM or less, 90 µM or less, 80 µM or less, 70 µM or less, 60 µM or less, 50 µM or less, 40 µM or less, 30 µM or less, 20 µM or less, or 15 µM or less.

The suspension culture in the present invention may include a step of culturing pluripotent stem cells in the presence of a WNT protein secretion inhibitor. The WNT protein secretion inhibitor is an additive having an effect of inhibiting extracellular secretion of WNT protein. For example, the WNT protein secretion inhibitor inhibits extracellular secretion of WNT protein by inactivating Porcupine (Porcn), which is a membrane-bound acyltransferase, in a cell and inhibiting palmitoylation of Wnt protein.

Examples of the WNT protein secretion inhibitor include IWP-2, IWP-01, IWP-L6, IWP-3, IWP-4, GNF-6231, WNT-C59, LGK974 (WNT974), or ETC-159 (ETC-1922159), and the like. When a WNT protein secretion inhibitor such as IWP-2 is used, a concentration added in the medium is not particularly limited, but a lower limit is preferably, for example, 0.1 µM or more, 0.2 µM or more, 0.5 µM or more, 1 µM or more, 2 µM or more, 3 µM or more, 4 µM or more, 5 µM or more, 6 µM or more, 7 µM or more, 8 µM or more, 9 µM or more, or 10 µM or more. An upper limit is preferably, for example, 200 µM or less, 150 µM or less, 100 µM or less, 90 µM or less, 80 µM or less, 70 µM or less, 60 µM or less, 50 µM or less, 40 µM or less, 30 µM or less, 20 µM or less, or 15 µM or less.

As pluripotent stem cells for the suspension culture, pluripotent stem cells prepared by a conventional method can be used. For example, pluripotent stem cells can be released by, for example, a mechanical, chemical, or biological method after the above-described maintenance culture, and seeded in a medium for the suspension culture. For example, by using EDTA, TryPLE™ Select, Accutase™, collagenase, DISPASE, trypsin, trypsin/EDTA, trypsin/collagenase, ReLeSR™ (STEMCELL Technologies Inc.), or the like as a cell releasing solution, pluripotent stem cells are released from a culture substrate or released from each other. After sufficiently dispersing the cells, they are used in the suspension culture. For dispersing the cells, the cells can be caused to pass through a strainer and dispersed into single cells.

A culture container for the suspension culture is not particularly limited, and it is possible to use a plate for suspension culture, a bioreactor, and the like. The culture container is not particularly limited. A culture container that has not been subjected to artificial treatment to improve adhesiveness to cells may be used (for example, coating treatment with an extracellular matrix or the like), or a culture container that has been subjected to treatment to artificially inhibit adhesion may be used (for example, coating treatment with polyhydroxyethyl methacrylic acid). Furthermore, the shape of the culture container is not particularly limited. For example, culture containers, which have a shape such as a dish shape, a flask shape, a well shape, a bag shape, and a spinner flask shape, are exemplary examples.

The suspension culture may be static culture or may be culture under a condition in which a liquid medium flows. When performing the static culture, for example, a viscosity of a medium, or the like may be utilized, or microwells having unevenness, or the like may be used. The culture under a condition in which a liquid medium flows may be culture under a condition in which a liquid medium is suspended using a spinner or the like, but is preferably culture under a condition in which a liquid medium flows to promote cell aggregation. Examples of the culture under a condition in which a liquid medium flows to promote cell aggregation include culture under a condition in which a liquid medium flows so that cells gather at one point due to stress (centrifugal force, centripetal force) caused by flow such as gyrating flow and rocking flow, and culture under a condition in which a liquid medium flows by linear reciprocating motion, where the culture utilizing gyrating flow and/or rocking flow is particularly preferable.

Gyratory culture (shaking culture) is performed by gyrating a culture container accommodating a liquid medium and cells along approximately a horizontal plane in a closed orbit such as a circle, an ellipse, a flat circle, or a flat ellipse. A gyrating speed is not particularly limited, but it is preferably 200 rpm or less, and it may be 150 rpm or less, 120 rpm or less, 115 rpm or less, 110 rpm or less, 105 rpm or less, 100 rpm or less, 95 rpm or less, or 90 rpm or less. A lower limit of a gyrating speed is not particularly limited, but it is preferably 1 rpm or more, and it may be 10 rpm or more, 50 rpm or more, 60 rpm or more, 70 rpm or more, 80 rpm or more, or 90 rpm or more. When a gyrating speed is within this range, cell aggregates having appropriate sizes are easily formed, and cells can suitably grow.

A gyrating width during the gyratory culture is not particularly limited, but it is preferably 1 mm or more, and it may be 10 mm or more, 20 mm or more, or 25 mm or more. An upper limit of the gyrating width is not particularly limited, but it is preferably 200 mm or less, and it may be 100 mm or less, 50 mm or less, 30 mm or less, or 25 mm or less. A radius of rotation during the gyratory culture is also not particularly limited, but it is preferably set such that a gyrating width is within the above-mentioned range. The radius of rotation is preferably 5 mm or more, and it may be 10 mm or more. An upper limit of the radius of rotation is not particularly premised, but it is preferably 100 mm or less, and it may be 50 mm or less. When a gyrating width is within this range, cell aggregates having appropriate sizes are easily formed, and cells can suitably grow.

Rocking culture is culture performed while flowing a liquid medium by rocking stirring. The rocking culture is performed by rocking a culture container accommodating a liquid medium and cells in a plane substantially vertical to a horizontal plane. A rocking speed is not particularly limited, but rocking can be performed, for example, 2 to 50 times per minute, preferably 4 to 25 times per minute (where one round trip is one time). A rocking angle is not particularly limited, but it can be, for example, 0.10 to 20°, and can be more preferably 2° to 10°.

Furthermore, culture can also be performed while stirring by a motion in which the above-described gyrating and rocking are combined.

Culture using a spinner flask-shaped culture container is culture performed while stirring a liquid medium using a stirring blade in the culture container. A rotation speed and an amount of a medium are not particularly limited. In a case of a commercially available spinner flask-shaped culture container, an amount of a culture solution recommended by the manufacturer can be suitably used. A rotation speed is not particularly limited, but it can be, for example, 10 rpm or more and 300 rpm or less.

When performing the suspension culture, it is possible to appropriately adjust a seeding density of pluripotent stem cells in the medium (cell density at the start of the suspension culture). A lower limit of the seeding density is preferably, for example, $1\times10^4$ cells/mL or more, $2\times10^4$ cells/mL or more, or $1\times10^5$ cells/mL or more, and an upper limit thereof is preferably, for example, $1\times10^7$ cells/mL or less, or $1\times10^6$ cells/mL or less. When a seeding density is within this range, cell aggregates having appropriate sizes are easily formed, and cells can suitably grow.

An amount of the medium at the time of the suspension culture can be appropriately adjusted depending on culture containers used. For example, when using a 12-well plate (where the area of a bottom surface of the well in a plan view per well is 3.5 cm$^2$), an amount of the medium can be 0.5 mL/well or more and 1.5 mL/well or less, and can be more preferably 1 mL/well. For example, when using a 6-well plate (where the area of a bottom surface of the well in a plan view per well is 9.6 cm$^2$), a lower limit of an amount of the medium is preferably 1.5 mL/well or more, and it may be 2 mL/well or more, or 3 mL/well or more; and an upper limit of an amount of the medium is preferably 6.0 mL/well or less, and it may be 5 mL/well or less, or 4 mL/well or less. For example, when using a 125 mL Erlenmeyer flask (Erlenmeyer flask having a capacity of 125 mL), a lower limit of an amount of the medium is preferably 10 mL/container or more, and it may be 30 mL/container or more; and an upper limit of an amount of the medium may be preferably 50 mL/container or less. For example, when using a 500 mL Erlenmeyer flask (Erlenmeyer flask having a capacity of 500 mL), a lower limit of an amount of the medium is preferably 100 mL/container or more, and it may be 120 mL/container or more; and an upper limit of an amount of the medium is preferably 150 mL/container or less, and it may be 125 mL/container or less. For example, when using a 1000 mL Erlenmeyer flask (Erlenmeyer flask having a capacity of 1000 mL), a lower limit of an amount of the medium is preferably 250 mL/container or more, and it may be 290 mL/container or more; and an upper limit of an amount of the medium is preferably 350 mL/container or less, and it may be 310 mL/container or less. For example, in a case of a 2000 mL Erlenmeyer flask (Erlenmeyer flask having a capacity of 2000 mL), a lower limit of an amount of the medium is preferably 500 mL/container or more, and it may be 600 mL/container or more; and an upper limit of an amount of the medium is preferably 1000 mL/container or less, and it may be 700 mL/container or less. For example, in a case of a 3000 mL Erlenmeyer flask (Erlenmeyer flask having a capacity of 3000 mL), a lower limit of an amount of the medium is preferably 1000 mL/container or more, and it can be 1500 mL/container or more; and an upper limit of an amount of the medium is preferably 2000 mL/container or less, and it may be 1600 mL/container or less. For example, in a case of a 2 L culture bag (disposable culture bag having a capacity of 2 L), a lower limit of an amount of the medium is preferably 100 mL/bag or more, and it may be 500 mL/bag or more, or 1000 mL/bag or more; and an upper limit of an amount of the medium is preferably 2000 mL/bag or less, and it may be 1500 mL/bag or less, or 1100 mL/bag or less. For example, in a case of a 10 L culture bag (disposable culture bag having a capacity of 10 L), a lower limit of an amount of the medium is preferably 500 mL/bag or more, and it may be 1 L/bag or more, or 5 L/bag or more; and an upper limit of an amount of the medium is preferably 10 L/bag or less, and it may be 6 L/bag or less. For example, in a case of a 20 L culture bag (disposable culture bag having a capacity of 20 L), a lower limit of an amount of the medium is preferably 1 L/bag or more, and it may be 5 L/bag or more, or 10 L/bag or more; and an upper limit of an amount of the medium is preferably 20 L/bag or less, and it may be 15 L/bag or less, or 11 L/bag or less. For example, in a case of a 50 L culture bag (disposable culture bag having a capacity of 50 L), a lower limit of an amount of the medium is preferably 1 L/bag or more, and it may be 10 L/bag or more, or 25 L/bag or more; and an upper limit of an amount of the medium is preferably 50 L/bag or less, and it may be 40 L/bag or less, or 30 L/bag or less. When an amount of a culture solution is within this range, cell aggregates having appropriate sizes are easily formed, and cells can suitably grow.

A capacity of a culture container used can be appropriately selected and is not particularly limited, but it is preferably 0.32 cm$^2$ or more, and it may be 0.65 cm$^2$ or more, 1.9 cm$^2$ or more, 3.0 cm$^2$ or more, 3.5 cm$^2$ or more, 9.0 cm$^2$ or more, or 9.6 cm$^2$ or more as a lower limit of an area when a bottom surface of a portion accommodating a liquid medium is viewed in a plan view. An upper limit of the area is preferably 1000 cm$^2$ or less, and it may be 500 cm$^2$ or less, 300 cm$^2$ or less, 150 cm$^2$ or less, 75 cm$^2$ or less, 55 cm$^2$ or less, 25 cm$^2$ or less, or 21 cm$^2$ or less.

A culture temperature in the suspension culture is not particularly limited, but it is preferably from 36.0° C. to 38.0° C., and more preferably from 36.5° C. to 37.5° C. It is preferable to perform culture at an atmospheric $CO_2$ concentration of about 1% to 10%, preferably 5%, using a $CO_2$ incubator or the like.

A culture period of the suspension culture is not particularly limited, but a lower limit of the culture period may be 1 day or longer, 2 days or longer, 3 days or longer, 4 days or longer, 5 days or longer, 6 days or longer, 7 days or longer, 8 days or longer, 9 days or longer, or 10 days or longer, and an upper limit of the culture period may be 30 days or shorter, 29 days or shorter, 28 days or shorter, 27 days or shorter, 26 days or shorter, or 25 days or shorter.

In the present invention, the step of performing suspension culture preferably includes a step of forming a cell aggregate. A cell aggregate is a mass-like cell population formed by three-dimensionally aggregating a plurality of cells, and is also called a spheroid. A cell aggregate of pluripotent stem cells is formed from a cell population of pluripotent stem cells. Furthermore, a cell aggregate usually has a substantially spherical shape and generally has a diameter of about 50 m to 2000 m.

A dimension of a cell aggregate produced by the method of the present invention is not particularly limited, but in the case of observation with a microscope, an upper limit of the dimension of the widest portion in an observation image is preferably, for example, 1000 m or less, 900 m or less, 800 m or less, 700 m or less, 600 m or less, 500 m or less, 400 m or less, or 300 m or less. A lower limit of the dimension is preferably, for example, 30 m or more, 40 m or more, 50 m or more, 60 m or more, 70 m or more, 80 μm or more, 90 μm or more, or 100 μm or more. A cell aggregate having such a dimensional range is preferable as a cell growth environment because oxygen and nutrient components are easily supplied to cells inside.

In a group of cell aggregates formed by the present invention, for example, 10% or more, 20% or more, 30% or more, 40% or more, 50% or more, 60% or more, 70% or more, 80% or more, or 90% or more of the cell aggregates constituting the group based on a weight can have a dimension within the above-mentioned range. In a group of cell aggregates which contains 20% or more of cell aggregates having a dimension within the above-mentioned range, each of individual cell aggregates is preferable as a cell growth environment because oxygen and nutrient components are easily supplied to cells inside.

Furthermore, in a cell aggregate formed by the present invention, a proportion (survival rate) of living cells among cells constituting the cell aggregate is preferably, for example, 50% or more, 60% or more, 70% or more, 80% or more, or 90% or more. A cell population in which a survival rate is within the above-mentioned range is in a preferable state for cell growth.

When performing the suspension culture, it is preferable to perform medium exchange at an appropriate frequency. A frequency of medium exchange is not particularly limited and varies depending on the cell type and culture conditions, but a medium exchange operation can be performed at a frequency of preferably one time or more every 5 days, one time or more every 4 days, one time or more every 3 days, one time or more every 2 days, or one time or more every 1 day. Medium exchange at these frequencies is particularly suitable when culturing cell aggregates of pluripotent stem cells used in the present invention. The same liquid medium as described above can be used as a liquid medium used for the medium exchange, and the same conditions as described above can be used as culture conditions. A method for medium exchange is not particularly limited. For example, preferably, a total amount of a culture solution containing cell aggregates is recovered in a centrifuge tube, and is subjected to centrifugal separation or left to stand in a static state for 5 minutes; the supernatant is removed while leaving the precipitated cell aggregates; a fresh liquid medium is added thereafter to gently disperse the cell aggregates; thereafter, the dispersed cells are again returned to a culture container such as a plate; and thereby culturing of the cell aggregates can be continued.

When performing the suspension culture, it is preferable to perform passage at an appropriate frequency. A frequency of passage is not particularly limited, but a passage operation can be performed at a frequency of preferably one time or more every 8 days, one time or more every 7 days, one time or more every 6 days, one time or more every 5 days, one time or more every 4 days, or one time or more every 3 days. Passage at these frequencies is particularly suitable when culturing cell aggregates of pluripotent stem cells used in the present invention. A passage method is not particularly limited. For example, preferably, a total amount of a culture solution containing cell aggregates is recovered in a centrifuge tube, and is subjected to centrifugal separation or left to stand in a static state for 5 minutes; the supernatant is removed while leaving the precipitated cell aggregates; and thereby cell aggregates can be recovered. Furthermore, the recovered cell aggregates can be washed if necessary. A washing method is not particularly limited, but for example, cell aggregates can be washed by adding a washing liquid to cell aggregates recovered in a centrifuge tube, precipitating the cell aggregates again by the above-described method, and removing the supernatant. The number of washing is not limited. As a washing liquid, it is possible to use a buffer (including a PBS buffer), physiological saline, or a liquid medium (preferably a basal medium). The recovered cell aggregates are isolated by for example, a mechanical, chemical, or biological method, and seeded in a fresh medium for the suspension culture. Thereby, the suspension culture can be restarted. As a liquid medium and culture conditions used for the suspension culture after the passage, it is possible to use the same liquid medium and conditions as described above. For example, by using a cell releasing solution including EDTA, TryPLE™ Select, Accutase™, collagenase, DISPASE, trypsin, trypsin/EDTA, trypsin/collagenase, ReLeSR™, and the like as a release agent used for the isolation, cells are released from a culture substrate or released from each other. The cells are sufficiently dispersed by pipetting or using a strainer, and can be seeded in an isolated state.

After the suspension culture, cells are present in a suspended state in a culture solution. Accordingly, cell recovery can be achieved by removing a liquid component of the supernatant, from a static state or by centrifugal separation. Furthermore, as a cell recovery method, it is possible to select a filter, a hollow fiber separation membrane, or the like. When removing a liquid component from a static state, it is sufficient to leave a container containing a culture solution in a static state for about 5 minutes to remove the supernatant while leaving the precipitated cells and cell aggregates. Furthermore, it is sufficient for centrifugal separation to be performed at a rotation speed and a treatment time at which cells are not damaged due to the centrifugal force. For example, a lower limit of the rotation speed is not particularly limited as long as cells can be precipitated, but the lower limit can be, for example, 100 rpm or more, 500 rpm or more, 800 rpm or more, or 1000 rpm or more. Meanwhile, it is sufficient for an upper limit to be a speed at which cells are not damaged or are unlikely to be damaged due to centrifugal force. The upper limit can be, for example, 1400 rpm or less, 1500 rpm or less, or 1600 rpm or less. Furthermore, a lower limit of the treatment time is not particularly limited as long as it is a time in which cells can be precipitated at the above-mentioned rotation speed. The lower limit can be, for example, 10 seconds or longer, 30 seconds or longer, 1 minute or longer, 3 minutes or longer, or 5 minutes or longer. Furthermore, it is sufficient for an upper limit of the treatment time to be a time during which cells are not damaged or are unlikely to be damaged by the rotation. The upper limit can be, for example, 30 seconds or shorter, 6 minutes or shorter, 8 minutes or shorter, or 10 minutes or shorter. The recovered cells can be washed if necessary. A washing method is not particularly limited. For example, washing may be performed in the same manner as the washing method described in the "passage method" in the above-described suspension culture step. As a washing liquid, it is possible to use a buffer (including a PBS buffer), physiological saline, or a liquid medium (preferably a basal medium).

In the present invention, cell aggregates of pluripotent stem cells can be formed in a culture solution by the above-described suspension culture.

Pluripotent stem cells produced by the present invention can maintain an undifferentiated state.

The undifferentiated state of the cells can be confirmed by analyzing an expression state of an undifferentiation marker. Analysis of the expression state of the undifferentiation marker can be performed by, for example, real-time PCR, flow cytometry, or the like. Examples of undifferentiation markers include, but are not limited to, Oct4, Sox2, Nanog, SSEA-3, SSEA-4, TRA-1-60, TRA-1-81, REX-1, LIN28, LEFTB, GDF3, ZFP42, FGF4, ESG1, DPPA2, TERT, KLF4, c-Myc, Alkaline Phosphatase, and the like. Among them, Oct4, Sox2, and Nanog are preferable as the undifferentiation marker. The undifferentiation marker is synonymous with a pluripotent stem cell marker, and both terms can be used interchangeably.

Furthermore, pluripotent stem cells constituting a cell aggregate preferably retain an undifferentiated state.

A percentage of cells positive for OCT4 in a cell aggregate is preferably 90% or more, and it may be 91% or more, 92% or more, 93% or more, 94% or more, or 95% or more.

A percentage of cells positive for SOX2 in a cell aggregate is preferably 90% or more, and it may be 91% or more, 92% or more, 93% or more, 94% or more, 95% or more, 96% or more, 97% or more, 98% or more, or 99% or more.

A percentage of cells positive for Nanog in a cell aggregate is preferably 90% or more, and it may be 91% or more, 92% or more, 93% or more, 94% or more, 95% or more, or 96% or more.

A cell population of pluripotent stem cells constituting a cell aggregate, in which a percentage of cells positive for the undifferentiation marker is within the above-mentioned range, is in an undifferentiated state at a high percentage and is a more homogeneous cell population. The percentage of cells positive for the undifferentiation marker can be measured by flow cytometry analysis in which a fluorescently labeled antibody and a fluorescently labeled isotype control antibody against the undifferentiation marker are used.

A gene expression level of Oct4 in pluripotent stem cells obtained by the suspension culture is preferably $1.0\times10^{-1}$ or more, $1.2\times10^{-1}$ or more, $1.3\times10^{-1}$ or more, $1.4\times10^{-1}$ or more, or $1.5\times10^{-1}$ or more as a relative gene expression level with respect to ACTB (β-Actin) that is a housekeeping gene.

A gene expression level of SOX2 in pluripotent stem cells obtained by the suspension culture is preferably $1.7\times10^{-2}$ or more, $1.8\times10^{-2}$ or more, $1.9\times10^{-2}$ or more, $2.0\times10^{-2}$ or more, $2.1\times10^{-2}$ or more, $2.2\times10^{-2}$ or more, or $2.3\times10^{-2}$ or more as a relative gene expression level with respect to ACTB (β-Actin) that is a housekeeping gene.

A gene expression level of Nanog in pluripotent stem cells obtained by the suspension culture is preferably $1.0\times10^{-2}$ or more, $1.1\times10^{-2}$ or more, $1.2\times10^{-2}$ or more, $1.3\times10^{-2}$ or more, $1.4\times10^{-2}$ or more, $1.5\times10^{-2}$ or more, $1.6\times10^{-2}$ or more, $1.7\times10^{-2}$ or more, $1.8\times10^{-2}$ or more, $1.9\times10^{-2}$ or more, or $2.0\times10^{-2}$ or more as a relative gene expression level with respect to ACTB (β-Actin) that is a housekeeping gene.

Pluripotent stem cells, in which an expression level of the undifferentiation marker is within the above-mentioned range, are in an undifferentiated state at a high proportion and are a more homogeneous cell population.

Brachyury is a gene specifically expressed in the mesoderm and can be used as a marker gene for mesoderm cells.

An expression level of Brachyury in pluripotent stem cells obtained by the suspension culture is preferably $1.0\times10^{-4}$ or less, $1.0\times10^{-5}$ or less, or $1.0\times10^{-6}$ or less as a relative gene expression level with respect to ACTB (β-Actin) that is a housekeeping gene.

The above-mentioned SOX17 is a gene specifically expressed in the endoderm and can be used as a marker gene for endoderm cells.

An expression level of SOX17 in pluripotent stem cells obtained by the suspension culture is preferably $1.0\times10^{-5}$ or less, or $1.0\times10^{-6}$ or less as a relative gene expression level with respect to ACTB (β-Actin) that is a housekeeping gene.

It is possible to measure relative gene expression levels of the undifferentiation marker, the mesoderm marker, and the endoderm marker with respect to ACTB (β-Actin) by quantitative real-time PCR analysis.

[Pluripotent Stem Cells]

According to the present invention, pluripotent stem cells, which are produced by the above-described method for producing pluripotent stem cells according to the present invention, are provided.

Since the pluripotent stem cell of the present invention maintains an undifferentiated state, it is possible to efficiently induce differentiation into a desired cell. Any differentiation-inducing medium can be used for inducing differentiation of pluripotent stem cells into desired cells. As the differentiation-inducing medium, it is possible to use, for example, a nerve differentiation medium, an osteoblast differentiation medium, a cardiomyocyte differentiation medium, an adipocyte differentiation medium, an intestinal epithelial cell differentiation medium, and the like, but the differentiation-inducing medium is not particularly limited. As the differentiation-inducing medium, it is also possible to use an ectoderm differentiation medium, a mesoderm differentiation medium, or an endoderm differentiation medium.

[Method for Producing Somatic Cells]

The present invention also relates to a method for producing somatic cells, the method including culturing the pluripotent stem cells, produced by the above-described method for producing pluripotent stem cells according to the present invention, in the presence of a differentiation-inducing factor to differentiate them into somatic cells.

Examples of the differentiation-inducing factor used in the present invention include a substance that acts on TGFβ signaling, a substance that acts on WNT signaling, a substance that acts on Hedgehog signaling, a substance that acts on BMP signaling, and a substance that acts on Nodal/Activin signaling. Specifically, it is possible to use differentiation-inducing factors disclosed in PCT International Publication No. WO2016/063986, PCT International Publication No. WO2012/020845, and PCT International Publication No. WO2016/060260.

Furthermore, since the pluripotent stem cell produced by the method for producing pluripotent stem cells according to the present invention maintains an undifferentiated state, it is possible to efficiently induce differentiation into a desired somatic cell. Any differentiation-inducing medium can be used for inducing differentiation of pluripotent stem cells into desired cells. As the differentiation-inducing medium, it is possible to use, for example, a nerve differentiation medium, an osteoblast differentiation medium, a cardiomyocyte differentiation medium, an adipocyte differentiation medium, an intestinal epithelial cell differentiation medium, and the like, but the differentiation-inducing medium is not particularly limited. As the differentiation-inducing medium, it is possible to use an ectoderm differentiation medium, a mesoderm differentiation medium, or an endoderm differentiation medium. A desired somatic cell can be prepared by culturing the pluripotent stem cells of the present invention using a differentiation medium suitable for inducing differentiation into a desired somatic cell.

When it is intended to induce differentiation from pluripotent stem cells into endoderm cells, it is possible to use, for example, a method disclosed in Production of pancreatic hormone-expressing endocrine cells from human embryonic stem cells. by D'Amour et al., Nat Biotechnol. 2006 November; 24 (11): 1392-401, which is the document showing that human ES cells can be induced to differentiate into endoderm cells by culturing them in a medium containing WNT3a and activin A.

When it is intended to induce differentiation from pluripotent stem cells into mesoderm cells, it is possible to use, for example, a method disclosed in Published Japanese Translation No. 2013-530680 of the PCT International Publication. Published Japanese Translation No. 2013-530680 of the PCT International Publication discloses a method for producing intermediate mesoderm cells from human pluripotent stem cells, the method including a step (i) of culturing human pluripotent stem cells in a medium containing activin A and WNT, and a step (ii) of culturing the cells obtained in the step (i) in a medium containing BMP and WNT or a functional equivalent of WNT. Furthermore, J Am Soc Nephrol 25: 1211-12225, 2015 by Albert Q Lam et al. discloses that it is possible to efficiently induce differentiation into mesoderm cells by treating human pluripotent stem cells with CHIR 99021 which is a GSK30 inhibitor and thereafter treating them with FGF2 and retinoic acid. Also in the present invention, pluripotent stem cells can be induced to differentiate into mesoderm cells by using the differentiation-inducing factors described in the above documents.

When it is intended to induce differentiation from pluripotent stem cells into ectoderm cells, it is possible to adopt, for example, a method for culturing pluripotent stem cells in a medium containing a BMP inhibitor (Noggin or the like) and a TGFβ/activin inhibitor (Chambers S M. et al., Nat Biotechnol. 27, 275-280 (2009)), and a method for culturing pluripotent stem cells in a medium containing a BMP inhibitor (Noggin or the like) and a Nodal/activin inhibitor (Beata Surnacz et al., Stem Cells, 2012; 30: 1875-1884).

Culture conditions for differentiation induction are not particularly limited as long as they are conditions under which animal cells can be cultured, but for example, it is possible to use the same conditions as for the above-described maintenance culture of pluripotent stem cells. A culture temperature for differentiation induction is not particularly limited, but it is preferably from 36.0° C. to 38.0° C., and more preferably from 36.5° C. to 37.5° C. It is preferable to perform culture at an atmospheric $CO_2$ concentration of about 1% to 10%, preferably 5%, using a $CO_2$ incubator or the like.

Endoderm cells have an ability to differentiate into tissues of organs such as the digestive tract, lungs, thyroid, pancreas, and liver; secretory gland cells that open into the digestive tract; peritoneum; pleura; larynx; eustachian tube; trachea; bronchus; urinary tract (bladder, most parts of the urethra, a part of the ureter); and the like, and may be generally referred to as definitive endoderm (DE). Differentiation from pluripotent stem cells into endoderm cells can be confirmed by measuring an expression level of a gene specific to endoderm cells. Examples of genes specific to endoderm cells include SOX17, FOXA2, CXCR4, AFP, GATA4, EOMES, and the like.

An expression level of SOX17 in endoderm cells obtained by differentiation induction is preferably $1.0 \times 10^{-4}$ or more, $1.0 \times 10^{-3}$ or more, or $1.0 \times 10^{-2}$ or more as a relative gene expression level with respect to ACTB (β-Actin) that is a housekeeping gene. An expression level of FOXA2 in endoderm cells obtained by differentiation induction is preferably $1.0 \times 10^{-5}$ or more, $1.0 \times 10^{-4}$ or more, or $1.0 \times 10^{-3}$ or more as a relative gene expression level with respect to ACTB (β-Actin) that is a housekeeping gene. An expression level of CXCR4 in endoderm cells obtained by differentiation induction is preferably $1.0 \times 10^{-3}$ or more, $1.0 \times 10^{-2}$ or more, or $1.0 \times 10^{-1}$ or more as a relative gene expression level with respect to ACTB (β-Actin) that is a housekeeping gene.

Mesoderm cells are differentiated into body cavity and the mesothelium that lines the body cavity, muscles, skeleton, skin dermis, connective tissue, heart, blood vessels (including vascular endothelium), blood (including blood cells), lymph vessels, spleen, kidneys, ureter, gonads (testicles, uterus, gonadal epithelium), and the like. Examples of genes specific to mesoderm cells include MESP1, MESP2, FOXF1, BRACHYURY, HAND1, EVX1, IRX3, CDX2, TBX6, MIXL1, ISL1, SNAI2, FOXC1, CXCR4, VEGFR2, PDGFRα, and the like.

An expression level of CDX2 in mesoderm cells obtained by differentiation induction is preferably $1.0 \times 10^{-5}$ or more, $1.0 \times 10^{-4}$ or more, or $1.0 \times 10^{-3}$ or more as a relative gene expression level with respect to ACTB (β-Actin) that is a housekeeping gene. An expression level of CXCR4 in mesoderm cells obtained by differentiation induction is preferably $1.0 \times 10^{-5}$ or more, $1.0 \times 10^{-4}$ or more, or $1.0 \times 10^{-3}$ or more as a relative gene expression level with respect to ACTB (β-Actin) that is a housekeeping gene. An expression level of VEGFR2 in mesoderm cells obtained by differentiation induction is preferably $1.0 \times 10^{-4}$ or more, $1.0 \times 10^{-3}$ or more, or $1.0 \times 10^{-2}$ or more as a relative gene expression level with respect to ACTB (β-Actin) that is a housekeeping gene. An expression level of PDGFRα in mesoderm cells obtained by differentiation induction is preferably $1.0 \times 10^{-4}$ or more, $1.0 \times 10^{-3}$ or more, or $1.0 \times 10^{-2}$ or more as a relative gene expression level with respect to ACTB (β-Actin) that is a housekeeping gene.

Ectoderm cells form epidermis of the skin and epithelium at the end portion of the urethra in men, hair, nails, skin glands (including mammary glands and sweat glands), sensory organs (salivary glands including oral cavity, pharynx, nose, epithelium at the end portion of rectum) crystalline lens, and the like. Some ectoderm cells invaginate into grooves during a development stage and form a neural tube to also become the origin of neurons and melanocytes of the central nervous system such as the brain and the spinal cord. Ectoderm cells also form the peripheral nervous system. Examples of genes specific to ectoderm cells include FGF5, OTX2, SOX1, NESTIN, PAX6, and the like.

An expression level of PAX6 in ectoderm cells obtained by differentiation induction is preferably $1.0 \times 10^{-6}$ or more, $1.0 \times 10^{-5}$ or more, or $1.0 \times 10^{-4}$ or more as a relative gene expression level with respect to ACTB (β-Actin) that is a housekeeping gene. An expression level of SOX1 in ectoderm cells obtained by differentiation induction is preferably $1.0 \times 10^{-4}$ or more, $1.0 \times 10^{-3}$ or more, or $1.0 \times 10^{-2}$ or more as a relative gene expression level with respect to ACTB (β-Actin) that is a housekeeping gene. An expression level of NESTIN in ectoderm cells obtained by differentiation induction is preferably $1.0 \times 10^{-3}$ or more, $1.0 \times 10^{-2}$ or more, or $5.0 \times 10^{-2}$ or more as a relative gene expression level with respect to ACTB (β-Actin) that is a housekeeping gene.

The somatic cells produced by the production method of the present invention can be differentiation-induced from the pluripotent stem cells produced by the method for producing pluripotent stem cells of the present invention. Types of somatic cells are not particularly limited as long as they are somatic cells that can be present in the biological body. Examples thereof include somatic stem cells (mesenchymal stem cells, neural stem cells, and the like, which are derived from bone marrow, adipose tissue, dental pulp, placenta, egg membrane, umbilical cord blood, amniotic membrane, chorion membrane, or the like), nerve cells, glial cells, oligodendrocytes, Schwann cells, cardiac muscle cells, cardiac muscle progenitor cells, liver cells, hepatic progenitor cells, a cells, R cells, fibroblasts, cartilage cells, corneal cells, vascular endothelial cells, vascular endothelial progenitor cells, pericytes, skeletal muscle cells, megakaryocytes, hematopoietic stem cells, airway epithelial cells, germ cells, dendritic cells, eosinophils, mast cells, T cells, erythropoietin-producing cells, intestinal epithelium, alveolar epithelial cells, kidney cells, and the like. The somatic cells may be in a form in which a gene has been introduced into the above-mentioned cell, or a form in which a target gene or the like on the genome is knocked down in the above-mentioned cell.

The present invention will be specifically described with reference to the following examples, but the present invention is not limited to the examples.

EXAMPLES

Reference Example 1: Adhesion Culture of Human iPS Cell Line 201B7

(Step 1: Maintenance Culture of Human iPS Cells)
A human iPS cell line 201B7 (Center for iPS Cell Research and Application, Kyoto University) was seeded on a cell culture dish coated with Vitronectin (Thermo Fisher Scientific K.K.), and maintenance culture was performed at 37° C. under a 5% $CO_2$ atmosphere. StemFit™ AK02N (Ajinomoto Co., Inc.) was used as a medium, and medium exchange was performed every day. Y-27632 (FUJIFILM Wako Pure Chemical Corporation) was added into the medium only at the time of cell seeding so that a final concentration was 10 μM.
(Step 2: Adhesion Culture of Human iPS Cells)
The human iPS cell line 201B7 maintenance-cultured by the method of Step 1 above was treated with Accutase (Innovative Cell Technologies, Inc.) for 3 to 5 minutes to release the cells from the dish. The cells were dispersed into single cells by pipetting. These cells were suspended in a StemFit™ AK02N medium containing Y-27632 at a final concentration of 10 μM. A part of the cells was stained with trypan blue to measure the number of living cells. A cell suspension was prepared so that it contained $4.6 \times 10^4$ cells per mL using the StemFit™ AK02N medium containing Y-27632 at a final concentration of 10 μM. 2 mL of the cell suspension per well was seeded in a 6-well plate for cell culture (Sumitomo Bakelite Co., Ltd.) coated with Vitronectin at 0.5 μg/cm², and adhesion culture was performed at 37° C. in a 5% $CO_2$ environment. The day when the cells were seeded was defined as day 0 of the culture. Passage was performed on day 5 of the culture, and adhesion culture was performed until day 10 of the culture. Medium exchange was performed every day with a StemFit™ AK02N medium not containing Y-27632. On day 5 of the culture, the culture supernatant was recovered from the wells. 0.5 mL of Accutase was added per well to treat the cells for 3 to 5 minutes. The cells were released from the wells, and were dispersed into single cells by pipetting. These cells were suspended in a StemFit™ AK02N medium containing Y-27632 at a final concentration of 10 μM. A part of the cells was stained with trypan blue to measure the number of living cells. A cell suspension was prepared so that it contained $4.6 \times 10^4$ cells per mL using the StemFit™ AK02N medium containing Y-27632 at a final concentration of 10 μM. 2 mL of the cell suspension per well was seeded in a 6-well plate for cell culture coated with Vitronectin at 0.5 μg/cm², and adhesion culture was continued at 37° C. under a 5% $CO_2$ atmosphere. Phase-contrast images of the cells were acquired using a phase-contrast microscope on day 5 of the culture and day 10 of the culture. FIG. 1 shows the results.

Reference Example 2: Adhesion Culture of Human iPS Cell Line RPChiPS771-2

Figure 2:
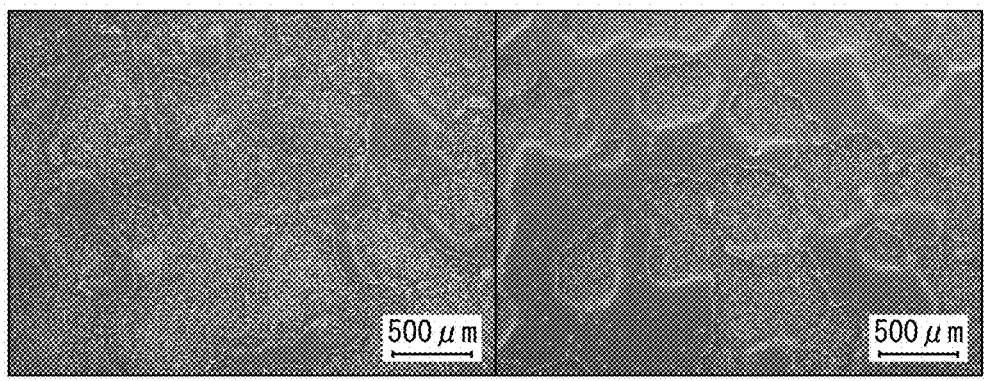
FIG. 2 shows phase-contrast images of day 5 and day 10 of adhesion culture of a human iPS cell line RPChiPS771-2.

(Step 1: Maintenance Culture of Human iPS Cells)
A human iPS cell line RPChiPS771-2 (ReproCELL Inc.) was maintenance-cultured by the same method as in Step 1 of Reference Example 1.
(Step 2: Adhesion Culture of Human iPS Cells)
The line RPChiPS771-2 maintenance-cultured in Step 1 of Reference Example 2 was adhesion-cultured by the same method as in Step 2 of Reference Example 1. Phase-contrast images of the cells were acquired using a phase-contrast microscope on day 5 of the culture and day 10 of the culture. FIG. 2 shows the results.

Comparative Example 1: Suspension Culture of Human iPS Cell Line 201B7

Figure 3:
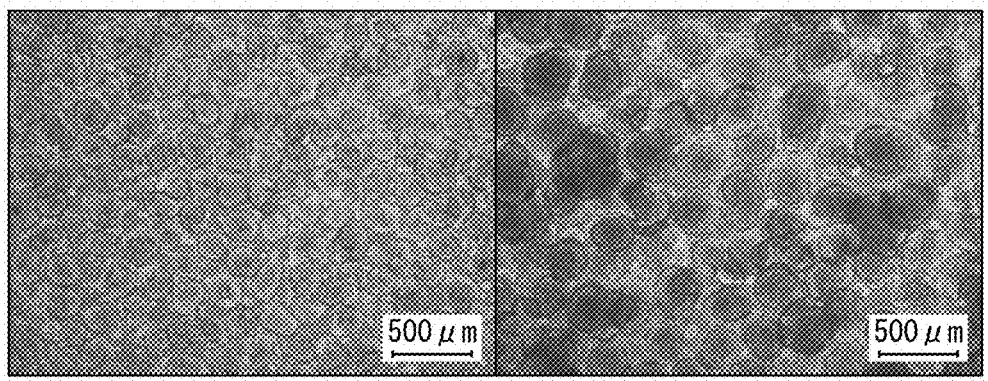
FIG. 3 shows phase-contrast images of day 5 and day 10 of suspension culture of the human iPS cell line 201B7.

(Step 1: Maintenance Culture of Human iPS Cell Line 201B7)
A human iPS cell line 201B7 was maintenance-cultured by the same method as in Step 1 of Reference Example 1.
(Step 2: Suspension Culture of Human iPS Cell Line 201B7)
The human iPS cell line 201B7 maintained in Step 1 of Comparative Example 1 was treated with Accutase for 3 to 5 minutes to release the cells from the dish. The cells were dispersed into single cells by pipetting. These cells were suspended in a StemFit™ AK02N medium containing Y-27632 at a final concentration of 10 μM. A part of the cells was stained with trypan blue to measure the number of living cells. A cell suspension was prepared so that it contained $2 \times 10^5$ cells per mL using the StemFit™ AK02N medium containing Y-27632 a final concentration of 10 μM. 4 mL of the cell suspension per well was seeded in a 6-well plate for suspension culture (Sumitomo Bakelite Co., Ltd.). The plate in which the cells were seeded was gyrated on a rotary shaker (Optima Instruments) at a speed of 83 rpm so that a gyrating width (diameter) drew a circle of 25 mm along a horizontal plane, and suspension culture was performed at 37° C. in a 5% $CO_2$ environment. The day when the cells were seeded was defined as day 0 of the culture. Passage was performed on day 5 of the culture, and suspension culture was performed until day 10 of the culture. Medium exchange was performed as follows. A total amount of the medium containing cell aggregates was recovered in a centrifuge tube and left to stand for about 5 minutes to precipitate the cell aggregates. Thereafter, the culture supernatant was removed. The cell aggregates were gently suspended again in a StemFit™ AK02N medium and returned to the original wells. At the time of medium exchange, Y-27632 was added into the StemFit™ AK02N medium on day 1 and day 6 of the culture so that a final concentration was 5 µM, and Y-27632 was added into the StemFit™ AK02N medium on day 2 and day 7 of the culture so that a final concentration was 2 µM. On day 5 of the culture, the cell aggregates and the culture supernatant were recovered in a centrifuge tube from the wells and left to stand for about 5 minutes to precipitate the cell aggregates and recover the culture supernatant. 1 mL of Accutase was added to the cell aggregates, and the cell aggregates were treated for 10 minutes. The cell aggregates were dispersed into single cells by pipetting. These cells were suspended in a StemFit™ AK02N medium containing Y-27632 at a final concentration of 10 µM. A part of the cells was stained with trypan blue to measure the number of living cells. A cell suspension was prepared so that it contained $2 \times 10^5$ cells per mL using the StemFit™ AK02N medium containing Y-27632 a final concentration of 10 µM. 4 mL of the cell suspension per well was seeded in a 6-well plate for suspension culture. The plate in which the cells were seeded was gyrated on a rotary shaker at a speed of 83 rpm so that a gyrating width (diameter) drew a circle of 25 mm along a horizontal plane, and suspension culture was continued at 37° C. in a 5% $CO_2$ environment. Phase-contrast images of the cell aggregates were acquired using a phase-contrast microscope on day 5 of the culture and day 10 of the culture. FIG. 3 shows the results.

Comparative Example 2: Suspension Culture of Human iPS Cell Line RPChiPS771-2

(Step 1: Maintenance Culture of Human iPS Cell Line RPChiPS771-2)

A human iPS cell line RPChiPS771-2 was maintenance-cultured by the same method as in Step 1 of Reference Example 1.

(Step 2: Suspension Culture of Human iPS Cell Line RPChiPS771-2)

Figure 4:
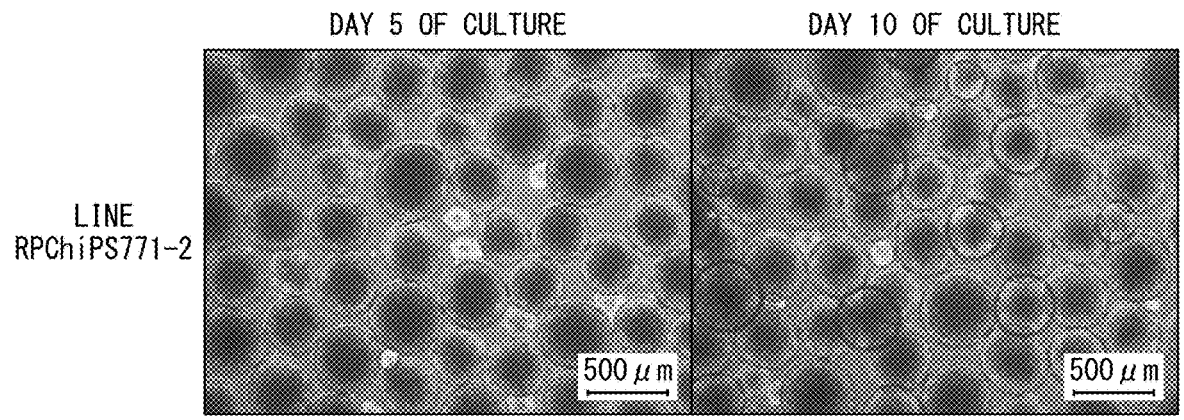
FIG. 4 shows phase-contrast images of day 5 and day 10 of suspension culture of the human iPS cell line RPChiPS771-2.

The human iPS cell line RPChiPS771-2 maintenance-cultured in Step 1 of Comparative Example 2 was suspension-cultured by the same method as in Step 2 of Comparative Example 1. Phase-contrast images of the cell aggregates were acquired using a phase-contrast microscope on day 5 of the culture and day 10 of the culture. FIG. 4 shows the results.

Comparative Example 3: Quantitative Real-Time PCR Analysis and ELISA Analysis

Quantitative real-time PCR analysis was performed on the cells obtained in Reference Example 1, Reference Example 2, Comparative Example 1, and Comparative Example 2 by the procedure shown below.

Cells on day 10 of the culture were treated with Accutase for 3 to 10 minutes and dispersed into single cells by pipetting. These cells were lysed using TRIzol™ Reagent (Thermo Fisher Scientific K.K.). Total RNA was isolated and purified from a cell solution obtained by lysing with TRIzol™ Reagent using a PureLink™ RNA Mini kit (Thermo Fisher Scientific K.K.). A concentration of the purified RNA was measured using BioSpec-nano (Shimadzu Corporation), and 40 ng was separated. 2 µL of ReverTra Ace™ qPCR RT Master Mix (TOYOBO CO., LTD.) and RNase Free $dH_2O$ were added to the separated RNA to prepare 10 µL. cDNA synthesis was performed using SimpliAmp Thermal Cycler (Thermo Fisher Scientific K.K.). Reaction conditions for the cDNA synthesis were as follows: a reaction was caused at 37° C. for 15 minutes; thereafter, a reaction at 50° C. for 5 minutes and a reaction at 98° C. for 5 minutes were consecutively caused; and thereafter, cooling was performed to 4° C. A synthesized cDNA solution was diluted 100-fold with 10 mM Tris-HCl pH 8.0 (NACALAI TESQUE, INC.) and added to a 384-well PCR plate (Thermo Fisher Scientific K.K.) at 5 L/well. KOD SYBR(R) qPCR Mix (TOYOBO CO., LTD.), a Forward primer prepared to 50 µM, a Reverse primer prepared to 50 µM, and DEPC-treated water (NACALAI TESQUE, INC.) were mixed at a ratio of 100:1:1:48. This mixed solution was added to the above-mentioned 384-well PCR plate at 15 L/well and mixed. For the primers, bACT, OCT4, SOX2, Nanog, Brachyury, and SOX17 were used. The 384-well PCR plate was subjected to centrifugal separation to remove air bubbles in the wells, and quantitative real-time PCR analysis was performed using QuantStudio 7 Flex Real-Time PCR System (Thermo Fisher Scientific K.K.). Table 1 shows reaction conditions.

TABLE 1

| Step | Temperature | Time | Number of cycles |
|---|---|---|---|
| 1 Initial denaturation | 98° C. | 1 min. | — |
| 2 Denaturation | 98° C. | 15 sec. | 5 cycles |
| 3 Annealing and extension | 68° C. | 30 sec. | |
| 4 Denaturation | 98° C. | 15 sec. | |
| 5 Annealing | 60° C. | 10 sec. | 40 cycles |
| 6 Extension | 68° C. | 30 sec. | |
| 7 Melting curve | 95° C. | 15 sec. | — |
| | 60° C. | 1 min. | |
| | 98° C. | 15 sec. | |

Base sequences of the primers used in the quantitative real-time PCR analysis are shown below (also shown in SEQ ID NOs: 1 to 12 in the sequence listing).

```
ACTB (F):
                                       (SEQ ID NO: 1)
5'-CCTCATGAAGATCCTCACCGA-3'

ACTB (R):
                                       (SEQ ID NO: 2)
5'-TTGCCAATGGTGATGACCTGG-3'

OCT4 (F):
                                       (SEQ ID NO: 3)
5'-AGTGGGTGGAGGAAGCTGACAAC-3'

OCT4 (R):
                                       (SEQ ID NO: 4)
5'-TCGTTGTGCATAGTCGCTGCTTGA-3'

SOX2 (F):
                                       (SEQ ID NO: 5)
5'-CACCAATCCCATCCACACTCAC-3'

SOX2 (R):
                                       (SEQ ID NO: 6)
5'-GCAAAGCTCCTACCGTACCAC-3'

Nanog (F):
                                       (SEQ ID NO: 7)
5'- AGCCTCCAGCAGATGCAAGAACTC-3'

Nanog (R):
                                       (SEQ ID NO: 8)
5'-TTGCTCCACATTGGAAGGTTCCCA-3'

Brachyury (F):
                                       (SEQ ID NO: 9)
5'-TCACAAAGAGATGATGGAGGAAC-3'
```

-continued

Brachyury (R):
(SEQ ID NO: 10)
5'-ACATGCAGGTGAGTTGTCAG-3'

SOX17 (F):
(SEQ ID NO: 11)
5'-ATCTGCACTTCGTGTGCAAG-3'

SOX17 (R):
(SEQ ID NO: 12)
5'-GAGTCTGAGGATTTCCTTAGCTC-3'

Figure 5:
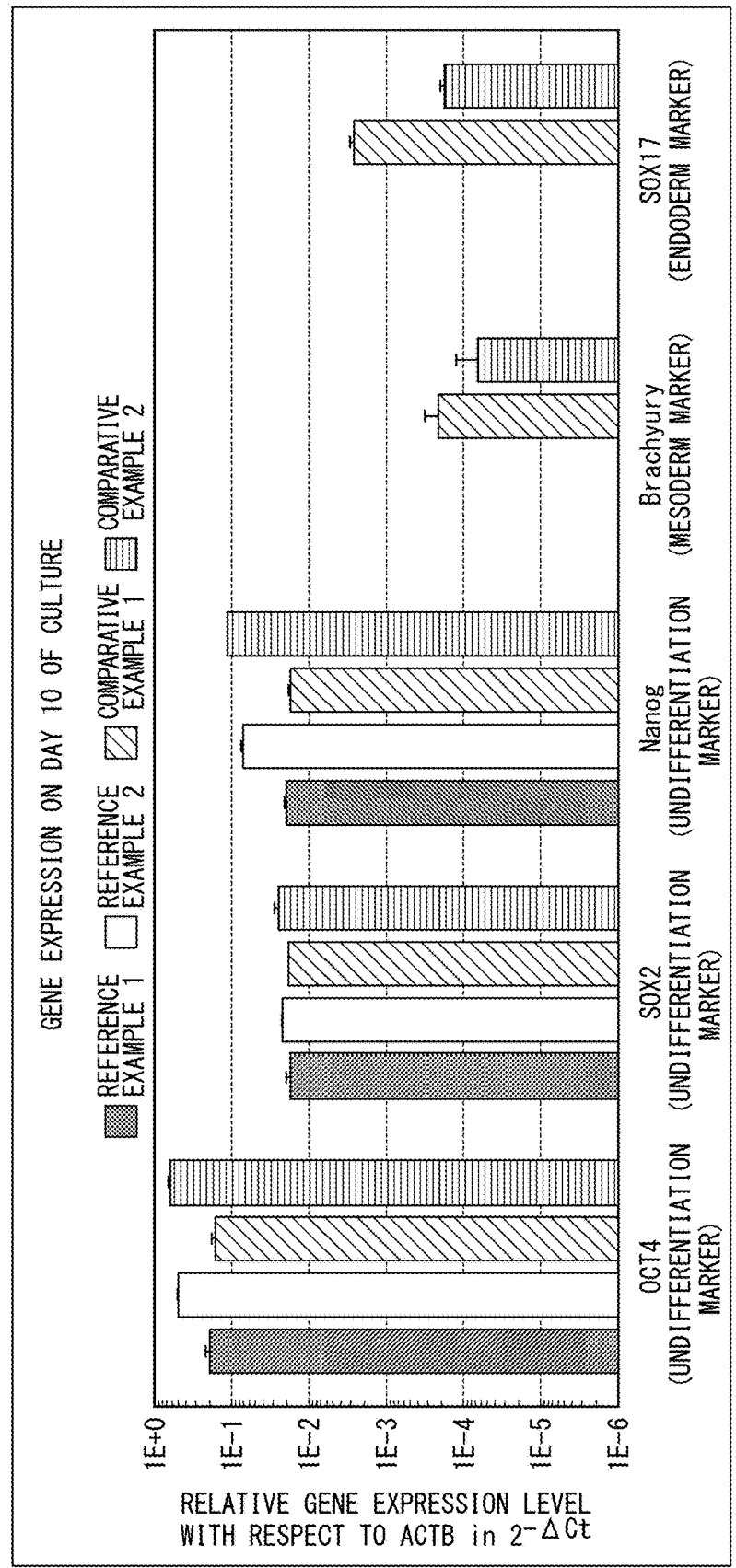
FIG. 5 shows results of measuring gene expression on day 10 when the human iPS cell lines 201B7 and RPChiPS771-2 were adhesion-cultured and suspension-cultured.

Table 2 and FIG. 5 show results of measuring gene expression.

TABLE 2

| | Relative gene expression level with respect to ACTB in $2^{-\Delta Ct}$ | | | | | | | | | |
|---|---|---|---|---|---|---|---|---|---|---|
| | OCT4 | | SOX2 | | Nanog | | Brachyury | | SOX17 | |
| | Average value | Standard deviation | Average value | Standard deviation | Average value | Standard deviation | Average value | Standard deviation | Average value | Standard deviation |
| Reference Example 1 | $1.94 \times 10^{-1}$ | $2.59 \times 10^{-2}$ | $1.73 \times 10^{-2}$ | $2.42 \times 10^{-3}$ | $1.96 \times 10^{-2}$ | $1.53 \times 10^{-3}$ | — | — | — | — |
| Reference Example 2 | $4.99 \times 10^{-1}$ | $1.50 \times 10^{-2}$ | $2.16 \times 10^{-2}$ | $8.78 \times 10^{-4}$ | $7.32 \times 10^{-2}$ | $1.87 \times 10^{-3}$ | — | — | — | — |
| Comparative Example 1 | $1.69 \times 10^{-1}$ | $1.23 \times 10^{-2}$ | $1.90 \times 10^{-2}$ | $2.00 \times 10^{-4}$ | $1.72 \times 10^{-2}$ | $1.43 \times 10^{-3}$ | $2.16 \times 10^{-4}$ | $1.00 \times 10^{-4}$ | $2.71 \times 10^{-3}$ | $3.45 \times 10^{-4}$ |
| Comparative Example 2 | $6.24 \times 10^{-1}$ | $4.02 \times 10^{-2}$ | $2.58 \times 10^{-2}$ | $3.05 \times 10^{-3}$ | $1.16 \times 10^{-1}$ | $1.28 \times 10^{-3}$ | $6.41 \times 10^{-5}$ | $6.24 \times 10^{-5}$ | $1.82 \times 10^{-4}$ | $2.22 \times 10^{-5}$ |

In Reference Example 1 and Reference Example 2 in which adhesion culture was performed, gene expression of Brachyury and SOX17, which are differentiation marker genes, was not detected. On the other hand, in Comparative Example 1 and Comparative Example 2 in which suspension culture was performed, gene expression of the differentiation marker genes was detected. Based on these results, it became clear that undifferentiation-deviated cells did not appear in the adhesion culture, whereas undifferentiation-deviated cells appeared in the suspension culture.

According to the procedure shown below, ELISA analysis of WNT3A protein was performed on the culture supernatant on day 5 of the culture obtained in Reference Example 1, Reference Example 2, Comparative Example 1, and Comparative Example 2. A concentration of the WNT3A protein contained in the medium (pg/mL), and an amount of the WNT3A protein in cells (pg/10⁴ cells) were calculated.

A reagent and a reaction plate attached to a WNT3A ELISA kit (Aviva Systems Biology Corporation) were returned to room temperature. A vial of WNT3A Standard attached to the kit was subjected to centrifugal separation, and a powder in the vial was collected. After adding 1 mL of a diluent solution attached to the kit and mixing, the mixture was left to stand at room temperature for 15 minutes to prepare a WNT3A solution at a final concentration of 10 ng/mL. Based on the WNT3A solution at a final concentration of 10 ng/mL, the solution was diluted with the diluent solution attached to the kit to create WNT3A solution dilution series at final concentrations of 0.156 ng/mL, 0.313 ng/mL, 0.625 ng/mL, 1.25 ng/mL, 2.5 ng/mL, and 5 ng/mL. The dilution series of 0.156 ng/mL to 10 ng/mL and the culture supernatant on day 5 of the culture were added to the reaction plate at 100 μL/well, and a plate seal was attached. The reaction plate was reacted at 37° C. for 2 hours to remove a liquid in the wells. 1×Biotinylated WNT3A Detector Antibody attached to the kit was added to each of the wells of the reaction plate at 100 L/well, and a plate seal was attached. The reaction plate was reacted at 37° C. for 1 hour to remove a liquid in the wells. Each of the wells of the reaction plate was washed three times at 300 L/well with a washing buffer attached to the kit. After removing the liquid in the wells of the reaction plate, 1×Avidin-HIRP Conjugate attached to the kit was added at 100 L/well, and a plate seal was attached. The reaction plate was reacted at 37° C. for 1 hour to remove a liquid in the wells. Each of the wells of the reaction plate was washed five times at 300 L/well with a washing buffer attached to the kit. After removing the liquid in the wells of the reaction plate, TMB Substrate attached to the kit was added at 90 L/well, and a plate seal was attached. The reaction plate was reacted at 37° C. for 20 minutes in a light-shielded environment. Thereafter, a Stop Solution attached to the kit was added at 50 L/well and mixed to complete the reaction.

Absorbance was measured at 450 nm (corrected wavelength 540 nm) using SpectraMax i3x Multi-Mode Detection Platform (Molecular Devices, LLC.), and a concentration of the WNT3A protein contained in the medium was calculated. Furthermore, an amount of the WNT3A protein of cells (pg/10⁴ cells) was calculated from the results of measuring the number of living cells on day 5 of the culture according to the following equation.

(Amount of WNT3A protein in cells)=(concentration of WNT3A protein contained in medium)× (amount of medium solution per well)/(number of living cells on day 5 of culture)×10⁴

Figure 6:
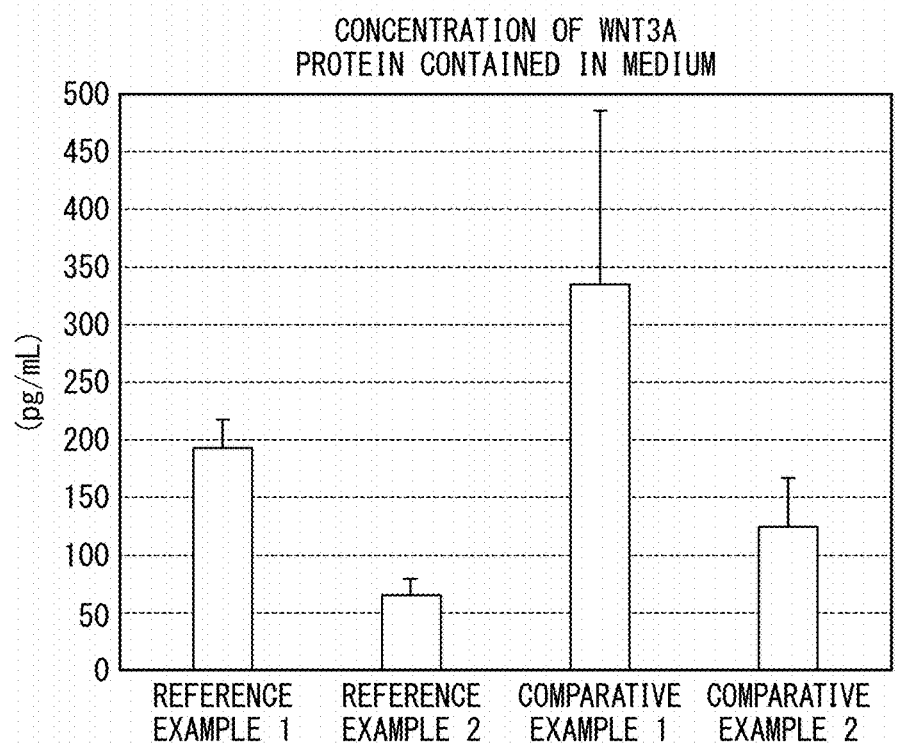
FIG. 6 shows a concentration of WNT3A protein contained in a medium on day 5 when the human iPS cell lines 201B7 and RPChiPS771-2 were adhesion-cultured and suspension-cultured.
Figure 7:
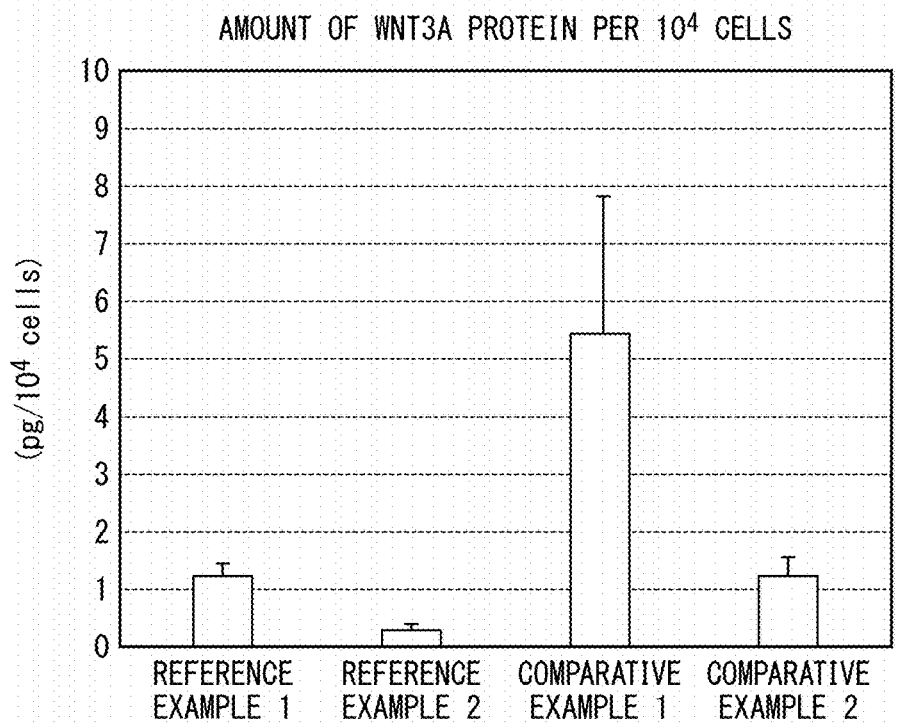
FIG. 7 shows an amount of WNT3A protein per $10^4$ cells in a medium on day 5 when the human iPS cell lines 201B7 and RPChiPS771-2 were adhesion-cultured and suspension-cultured.

Table 3 and FIGS. 6 and 7 show the calculated concentration of the WNT3A protein contained in the medium and amount of the WNT3A protein in the cells.

TABLE 3

| | Concentration of WNT3A protein contained in medium (pg/mL) | | Amount of WNT3A protein per 10⁴ cells (pg/10⁴ cells) | |
|---|---|---|---|---|
| | Average value | Standard deviation | Average value | Standard deviation |
| Reference Example 1 | 192.6 | 24.6 | 1.24 | 0.20 |
| Reference Example 2 | 65.1 | 15.1 | 0.32 | 0.08 |
| Comparative Example 1 | 334.2 | 151.1 | 5.44 | 2.39 |
| Comparative Example 2 | 124.3 | 42.8 | 1.24 | 0.31 |

When concentrations of the WNT3A protein contained in the medium in Reference Example 1 and Comparative Example 2 were compared, the concentration of the WNT3A protein in Reference Example 1 was higher than that in Comparative Example 2. Meanwhile, undifferentiation-deviated cells did not appear in Reference Example 1 but appeared in Comparative Example 2. These results indicate that undifferentiation-deviated cells may not appear even when a concentration of WNT protein contained in a medium is high, which are results inconsistent with Non Patent Document 4 disclosing that appearance of undifferentiation-deviated cells is inhibited by inhibiting secretion of WNT protein in pluripotent stem cells and lowering a concentration of WNT protein in a medium.

That is, the method of lowering a concentration of WNT protein in a medium does not truly solve the problem of the appearance of undifferentiation-deviated cells. Therefore, the inventors of the present invention set objects to investigating the cause of appearance of undifferentiation-deviated cells in suspension culture, and providing a method for inhibiting appearance of undifferentiation-deviated cells in suspension culture to prepare a homogeneous pluripotent stem cell population suitable for differentiation induction.

The inventors of the present invention thought that, in order to investigate the cause of appearance of undifferentiation-deviated cells in suspension culture, it is required to consider a difference in surrounding environments of cells between adhesion culture and suspension culture. It was speculated that, in the adhesion culture, cells form monolayer colonies, and therefore WNT protein secreted from the cells rapidly diffuses into a medium, whereas in the suspension culture, cell aggregates are formed, and therefore it takes time for WNT protein secreted from cells in the inside of the cell aggregates to diffuse into a medium at the outside of the cell aggregates. Accordingly, it is thought that, in the suspension culture, WNT protein accumulates in the inside of the cell aggregates at a high concentration, and therefore a concentration of WNT protein in contact with the cells in the inside of the cell aggregates is higher than a concentration of WNT protein contained in the medium at the outside the cell aggregates. That is, it is thought that, in order to inhibit appearance of undifferentiation-deviated cells in suspension culture, it is important to reduce an amount of WNT3A protein of cells in a medium (pg/$10^4$ cells) and/or an amount of WNT protein contained in a unit of a medium in contact with a unit area of a cell surface (g/mL cm$^2$), not reduction of a concentration of WNT protein contained in a medium. Furthermore, the amount of WNT3A protein of cells in a medium (pg/$10^4$ cells) and/or the amount of WNT protein contained in a unit of a medium in contact with a unit area of a cell surface (g/mL cm$^2$) can be indexes when predicting or evaluating appearance of undifferentiation-deviated cells.

When suspension culture was performed without controlling an amount of WNT protein secreted extracellularly in Comparative Example 1 and Comparative Example 2, undifferentiation-deviated cells appeared, and an amount of WNT3A protein of cells in the medium at this time was a value higher than 1.0 pg/$10^4$ cells.

Reference Example 3: Measurement of Amount of WNT Protein Contained in Unit of Medium in Contact with Unit Area of Cell Surface in Adhesion Culture Based on the analysis results of Comparative Example 3, since WNT protein is accumulated in the inside of the cell aggregates at a high concentration in the suspension culture, it was suggested that a concentration of WNT3A protein contained in the medium is not sufficient as an index for undifferentiation maintenance, and an amount of WNT protein contained in a unit of a medium in contact with a unit area of a cell surface is important for undifferentiation maintenance. Accordingly, in order to obtain a range within which undifferentiation can be maintained in adhesion culture regarding an amount of WNT protein contained in a unit of a medium in contact with a unit area of a cell surface, adhesion culture in which WNT3A protein was added was performed by the following method to reproduce an environment, in which undifferentiation-deviated cells appear, in a simulated manner.

(Step 1: Maintenance Culture of Human iPS Cells)

Human iPS cell lines 201B7 and RPChiPS771-2 were maintenance-cultured in the same procedure as in Step 1 of Reference Example 1.

(Step 2: Adhesion Culture of Human iPS Cells with Addition of WNT3A Protein into Medium)

Figure 8:
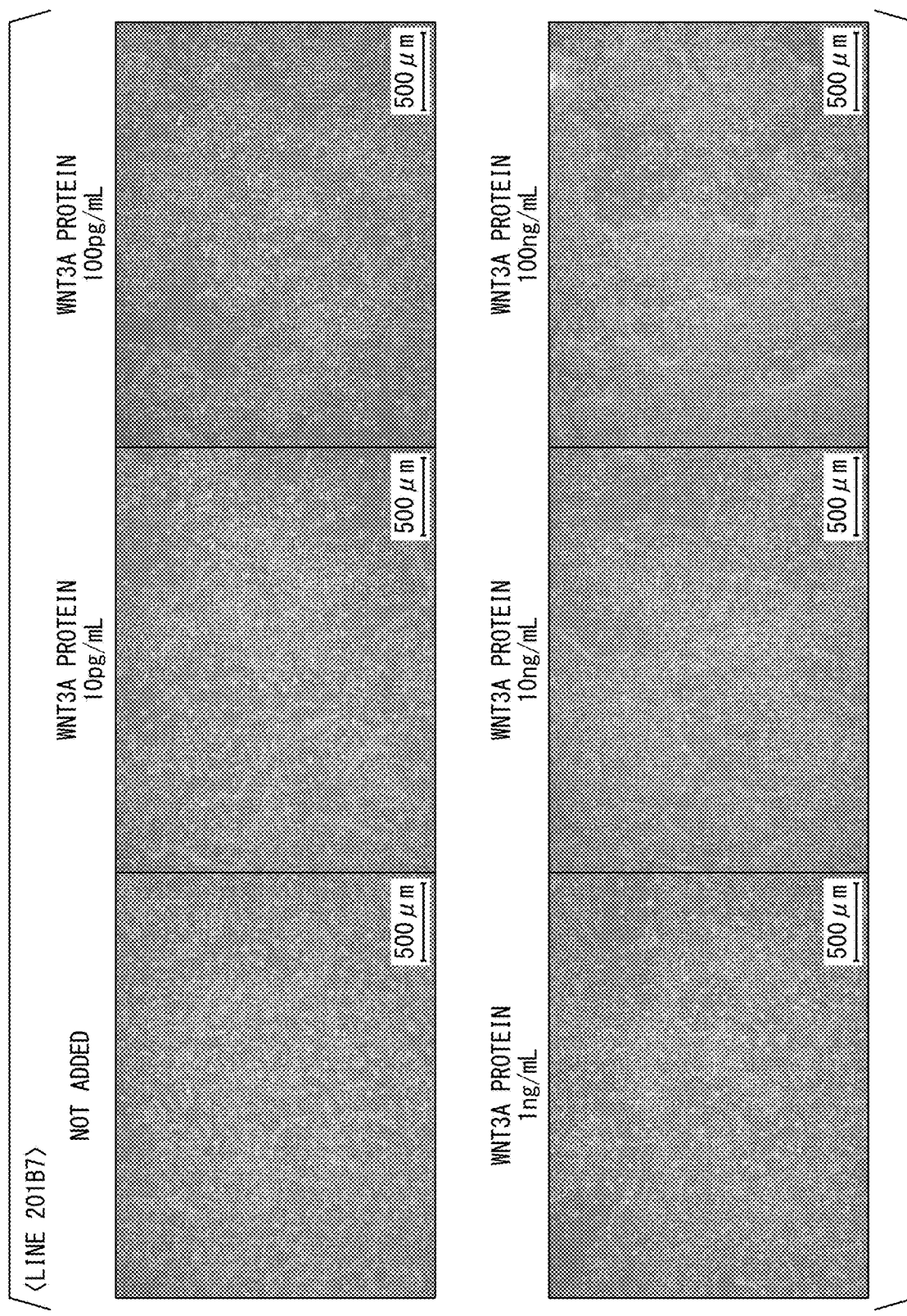
FIG. 8 shows phase-contrast images on day 5 when the human iPS cell line 201B7 was adhesion-cultured with or without addition of WNT3A protein.
Figure 9:
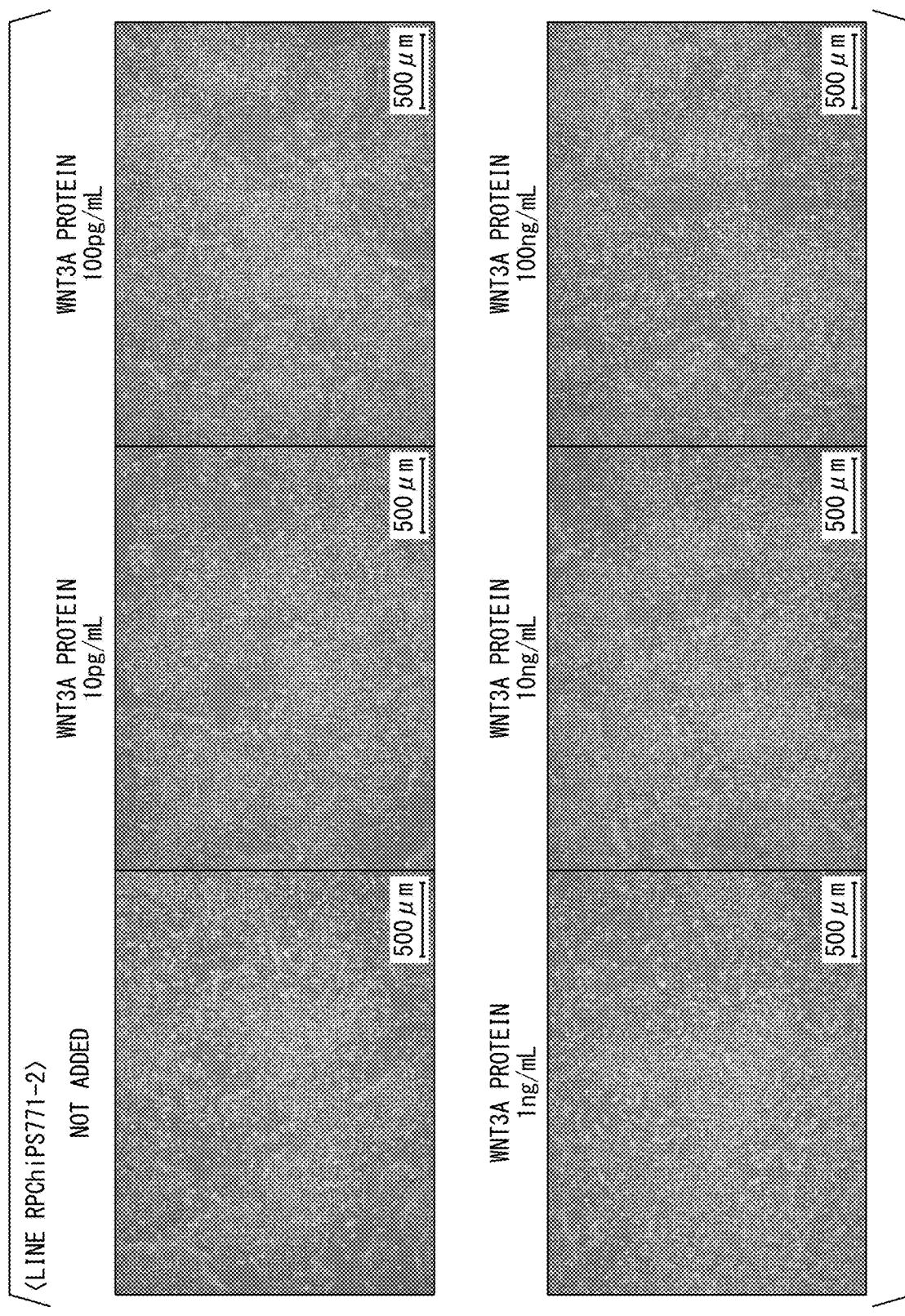
FIG. 9 shows phase-contrast images on day 5 when the human iPS cell line RPChiPS771-2 was adhesion-cultured with or without addition of WNT3A protein.

The human iPS cell lines 201B7 and RPChiPS771-2 maintenance-cultured in the procedure of Step 1 of Reference Example 3 were treated with Accutase for 3 to 5 minutes to release the cells from the dish. The cells were dispersed into single cells by pipetting. These cells were suspended in a StemFit™ AK02N medium containing Y-27632 at a final concentration of 10 μM. A part of the cells was stained with trypan blue to measure the number of living cells. A cell suspension was prepared so that it contained $4.6 \times 10^4$ cells per mL using the StemFit™ AK02N medium containing Y-27632 a final concentration of 10 μM. 2 mL of the cell suspension per well was seeded in a 6-well plate for cell culture (Sumitomo Bakelite Co., Ltd.) coated with 0.5 g of Vitronectin per 1 cm$^2$. WNT3A protein (R&D Systems, Inc.) was added to each of the wells so that final concentrations were 10 pg/mL, 100 pg/mL, 1 ng/mL, 10 ng/mL, and 100 ng/mL, and adhesion culture was performed at 37° C. in a 5% $CO_2$ environment. The day when the cells were seeded was defined as day 0 of the culture. The adhesion culture was performed until day 5 of the culture. Medium exchange was performed every day. As a medium, a StemFit™ AK02N medium, which does not contain Y-27632 and to which WNT3A was added at the same final concentration as at the time of seeding, was used. Phase-contrast images of the cells were acquired using a phase-contrast microscope on day 5 of the culture. FIG. 8 and FIG. 9 show the acquired phase-contrast images. Furthermore, on day 5 of the culture, the culture supernatant was recovered from the wells. 0.5 mL of Accutase was added per well to treat the cells for 3 to 5 minutes. The cells were released from the wells, and were dispersed into single cells by pipetting. These cells were suspended in a StemFit™ AK02N medium containing Y-27632 at a final concentration of 10 μM. A part of the cells was stained with trypan blue to measure the number of living cells.

The phase-contrast images on day 5 of the culture were analyzed with image analysis software (for example, ImageJ), and a proportion of a surface area of cells with respect to a culture area was calculated. From this value and the culture area (9.2 cm$^2$/well), an area in which the cell surface was in contact with the medium was calculated. Furthermore, a surface area (cm$^2$) in contact with the medium per cell was calculated from an area in which the cell surface was in contact with the medium and from the number of living cells on day 5 of the culture. An amount of WNT3A protein contained in a unit of a medium in contact with a unit area of the cell surface was calculated from the surface area in contact with the medium per cell and from a concentration of WNT3A protein added. The calculation of each of the values was performed according to the following equations.

(Proportion of surface area of cells with respect to culture area)/(area occupied by cells in phase-contrast image field of view)/(total area in phase-contrast image field of view)

(Area in which cell surface is in contact with medium)=(culture area per well)×(proportion of surface area of cells with respect to culture area)

(Surface area in contact with medium per cell)=(area in which cell surface is in contact with medium)/(number of living cells on day 5 of culture)

(Amount of WNT3A protein contained in unit of medium in contact with unit area of cell surface)=(concentration of WNT3A protein added)/(surface area in contact with medium per cell)

Figure 10:
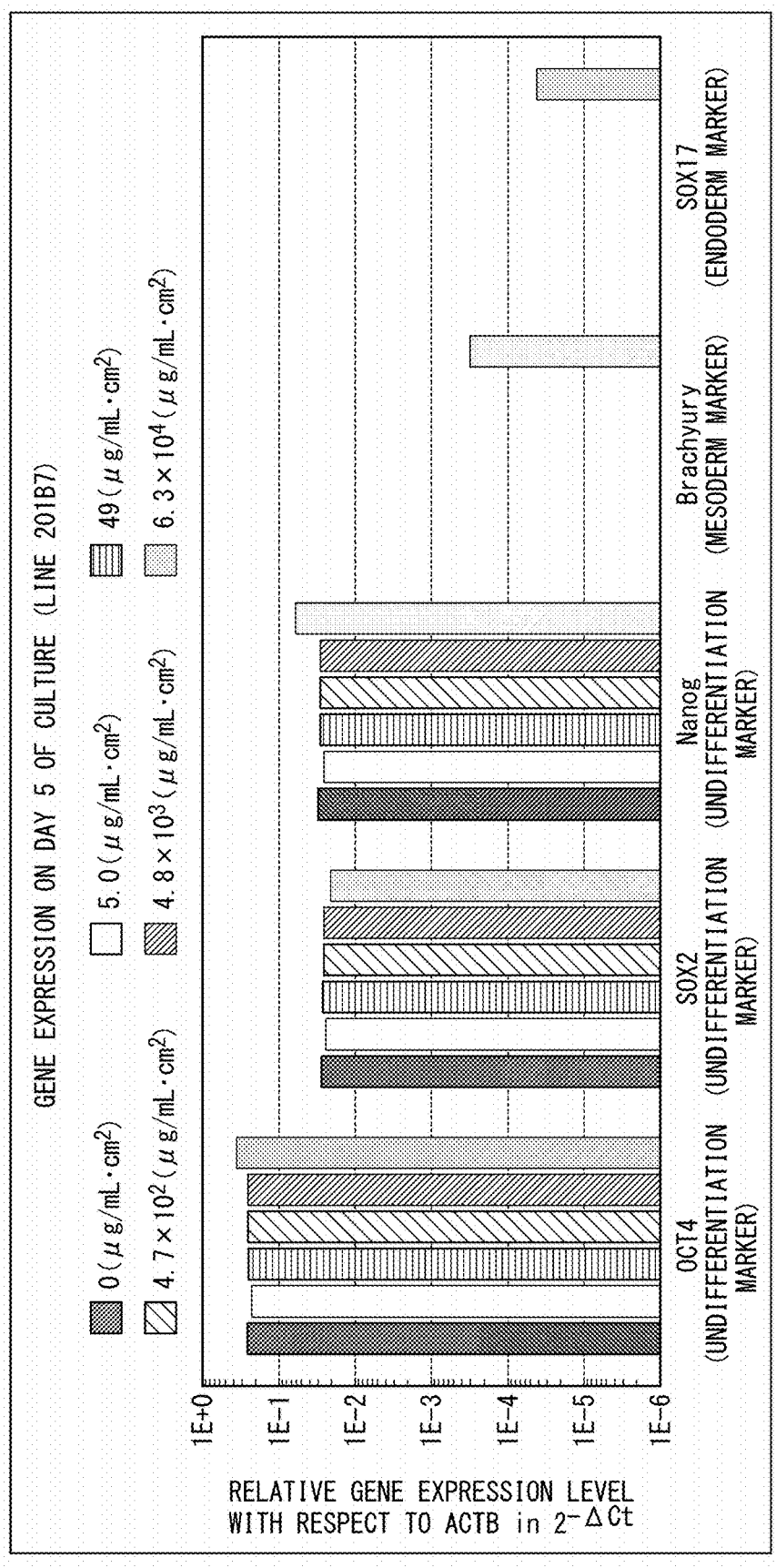
FIG. 10 shows results of measuring gene expression on day 5 when the human iPS cell line 201B7 was adhesion-cultured with or without addition of WNT3A protein.
Figure 11:
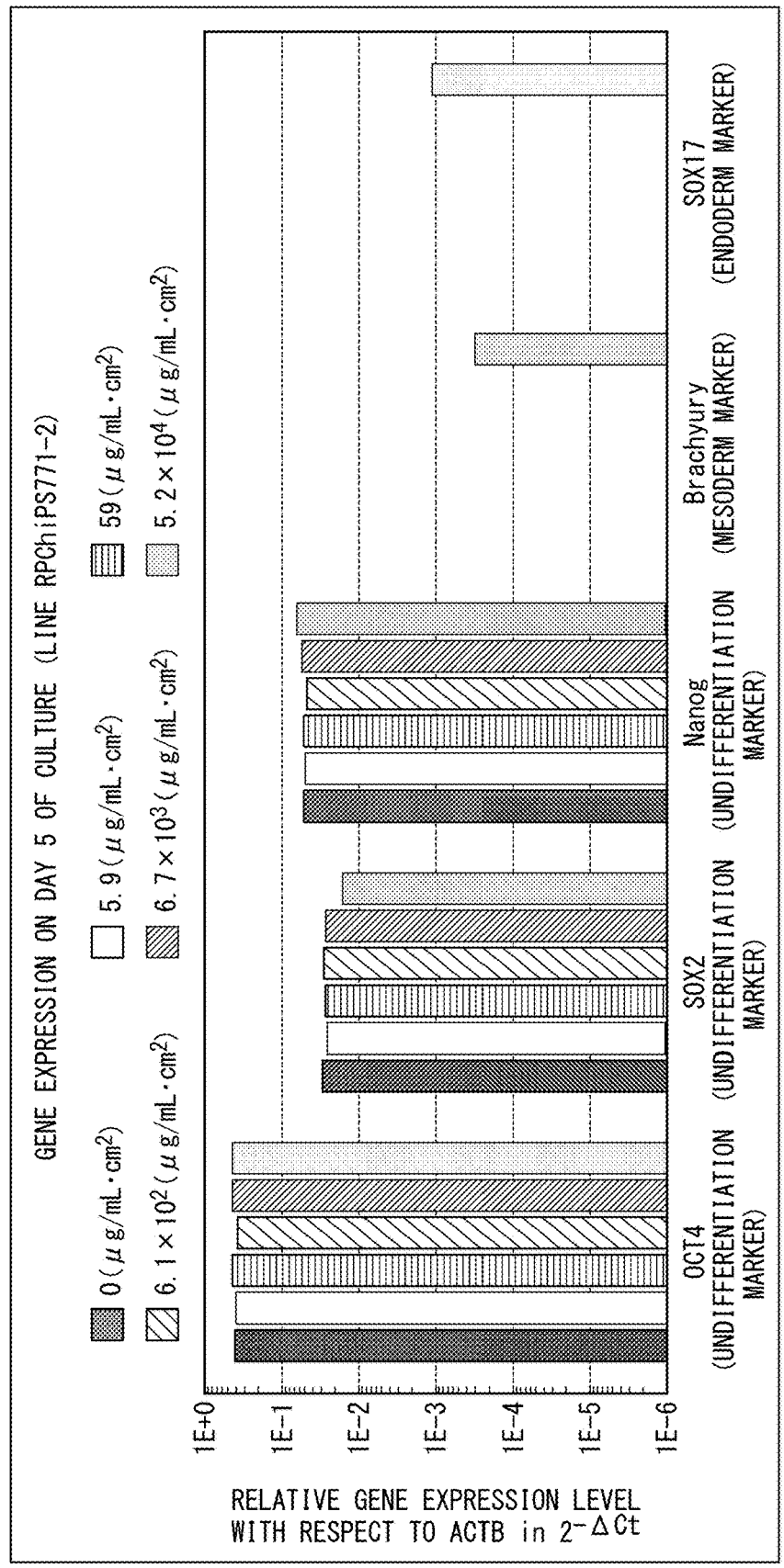
FIG. 11 shows results of measuring gene expression on day 5 when the human iPS cell line RPChiPS771-2 was adhesion-cultured with or without addition of WNT3A protein.

Quantitative real-time PCR analysis was performed in the same procedure as in Comparative Example 3 on cells obtained by being dispersed into single cells on day 5 of the culture, and an undifferentiated state of the obtained cell population was evaluated. Tables 4 and FIGS. 10 and 11 show the results of measuring gene expression and an amount of WNT3A protein, contained in the unit of the medium in contact with the unit area of the cell surface, under each culture condition.

Example 1: Suspension Culture of Human iPS Cell Line 201B7 Under Condition in which Secretion of WNT Protein is Inhibited (Step 1: Maintenance Culture of Human iPS Cell Line 201B7)

A human iPS cell line 201B7 was maintenance-cultured by the same method as in Step 1 of Reference Example 1.

(Step 2: Suspension Culture of Human iPS Cell Line 201B7)

Suspension culture was performed under a condition in which an amount of WNT protein contained in a unit of a medium in contact with a unit area of a cell surface was maintained at $2.9\times10^2$ µg/mL·cm$^2$ or less. Specifically, the human iPS cell line 201B7 maintenance-cultured by the method in Step 1 of Example 1 was treated with Accutase for 3 to 5 minutes to release the cells from the dish. The cells were dispersed into single cells by pipetting. These cells were suspended in a StemFit™ AK02N medium containing Y-27632 at a final concentration of 10 µM. A part of the cells was stained with trypan blue to measure the number of living cells. A cell suspension was prepared so that it contained $2\times10^5$ cells per mL using the StemFit™ AK02N medium containing Y-27632 a final concentration of 10 µM. 4 mL of the cell suspension per well was seeded in a 6-well plate for suspension culture (Sumitomo Bakelite Co., Ltd.). IWP-2 (FUJIFILM Wako Pure Chemical Corporation), which is a WNT protein secretion inhibitor, was added to the seeded wells so that a final concentration was 2 µM. The plate in

TABLE 4

| Cell line | Concentration of WNT3A protein in medium | Amount of WNT3A protein contained in unit of medium in contact with unit area of cell surface (µg/mL · cm$^2$) | Relative gene expression level with respect to ACTB in $2^{-\Delta Ct}$ | | | | |
|---|---|---|---|---|---|---|---|
| | | | OCT4 | SOX2 | Nanog | Brachyury | SOX17 |
| Line 201B7 | 0 pg/mL | 0 | $2.56 \times 10^{-1}$ | $2.75 \times 10^{-2}$ | $2.97 \times 10^{-2}$ | — | — |
| Line 201B7 | 10 pg/mL | 5.0 | $2.27 \times 10^{-1}$ | $2.44 \times 10^{-2}$ | $2.59 \times 10^{-2}$ | — | — |
| Line 201B7 | 100 pg/mL | 49 | $2.63 \times 10^{-1}$ | $2.75 \times 10^{-2}$ | $2.91 \times 10^{-2}$ | — | — |
| Line 201B7 | 1 ng/mL | $4.7 \times 10^2$ | $2.50 \times 10^{-1}$ | $2.57 \times 10^{-2}$ | $2.82 \times 10^{-2}$ | — | — |
| Line 201B7 | 10 ng/mL | $4.8 \times 10^3$ | $2.56 \times 10^{-1}$ | $2.55 \times 10^{-2}$ | $2.96 \times 10^{-2}$ | — | — |
| Line 201B7 | 100 ng/mL | $6.3 \times 10^4$ | $3.60 \times 10^{-1}$ | $2.08 \times 10^{-2}$ | $6.13 \times 10^{-2}$ | $3.14 \times 10^{-4}$ | $4.03 \times 10^{-5}$ |
| Line RPChiPS771-2 | 0 pg/mL | 0 | $4.05 \times 10^{-1}$ | $2.97 \times 10^{-2}$ | $5.21 \times 10^{-2}$ | — | — |
| Line RPChiPS771-2 | 10 pg/mL | 5.9 | $4.06 \times 10^{-1}$ | $2.64 \times 10^{-2}$ | $5.06 \times 10^{-2}$ | — | — |
| Line RPChiPS771-2 | 100 pg/mL | 59 | $4.44 \times 10^{-1}$ | $2.77 \times 10^{-2}$ | $5.30 \times 10^{-2}$ | — | — |
| Line RPChiPS771-2 | 1 ng/mL | $6.1 \times 10^2$ | $3.87 \times 10^{-1}$ | $2.89 \times 10^{-2}$ | $4.88 \times 10^{-2}$ | — | — |
| Line RPChiPS771-2 | 10 ng/mL | $6.7 \times 10^3$ | $4.42 \times 10^{-1}$ | $2.77 \times 10^{-2}$ | $5.53 \times 10^{-2}$ | — | — |
| Line RPChiPS771-2 | 100 ng/mL | $5.2 \times 10^4$ | $4.56 \times 10^{-1}$ | $1.66 \times 10^{-2}$ | $6.65 \times 10^{-2}$ | $3.07 \times 10^{-4}$ | $1.11 \times 10^{-3}$ |

Figure 12:
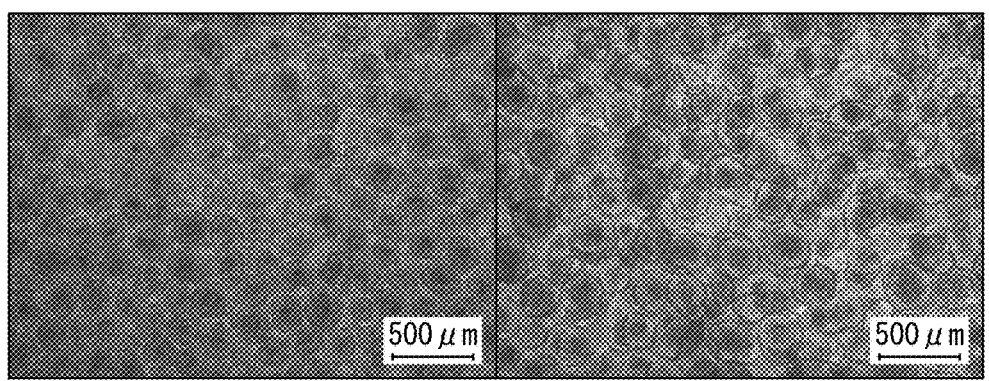
FIG. 12 shows phase-contrast images on day 5 and day 10 when the human iPS cell line 201B7 was suspension-cultured in a state where extracellular WNT protein secretion was inhibited.

When an amount of WNT3A protein contained in the unit of the medium in contact with the unit area of the cell surface was $6.7\times10^3$ µg/mL cm$^2$ or less, expression of the differentiation marker gene was not detected, and undifferentiation-deviated cells did not appear. On the other hand, when the amount was $5.2\times10^4$ µg/mL cm$^2$ or more, expression of the differentiation marker gene was detected, and undifferentiation-deviated cells appeared. Based on these results, it became clear that a homogeneous pluripotent stem cell population can be produced by culturing, in the adhesion culture, pluripotent stem cells under the condition in which an amount of WNT protein contained in the unit of the medium in contact with the unit area of the cell surface is $1.0\times10^4$ µg/mL cm$^2$ or less.

which the cells were seeded was gyrated on a rotary shaker (Optima Instruments) at a speed of 83 rpm so that a gyrating width (diameter) drew a circle of 25 mm along a horizontal plane, and suspension culture was performed at 37° C. in a 5% CO$_2$ environment. The day when the cells were seeded was defined as day 0 of the culture. Passage was performed on day 5 of the culture, and suspension culture was performed until day 10 of the culture. Medium exchange was performed as follows. A total amount of the medium containing cell aggregates was recovered in a centrifuge tube and left to stand for about 5 minutes to precipitate the cell aggregates. Thereafter, the culture supernatant was removed. The cell aggregates were gently suspended again in a StemFit™ AK02N medium containing IWP-2 at a final concentration of 2 µM and returned to the original wells. At the time of medium exchange, Y-27632 was added into the StemFit™ medium on day 1 and day 6 of the culture so that a final concentration was 5 μM, and Y-27632 was added into the StemFit™ medium on day 2 and day 7 of the culture so that a final concentration was 2 μM. On day 5 of the culture, the cell aggregates and the culture supernatant were recovered in a centrifuge tube from the wells and left to stand for about 5 minutes to precipitate the cell aggregates and recover the culture supernatant. 1 mL of Accutase was added to the cell aggregates, and the cell aggregates were treated for 10 minutes. The cell aggregates were dispersed into single cells by pipetting. These cells were suspended in a StemFit™ AK02N medium containing Y-27632 at a final concentration of 10 μM. A part of the cells was stained with trypan blue to measure the number of living cells. A cell suspension was prepared so that it contained $2 \times 10^5$ cells per mL using the StemFit™ AK02N medium containing Y-27632 a final concentration of 10 μM. 4 mL of the cell suspension per well was seeded in a 6-well plate for suspension culture. IWP-2 (FUJIFILM Wako Pure Chemical Corporation), which is a WNT protein secretion inhibitor, was added to the seeded wells so that a final concentration was 2 μM. The plate in which the cells were seeded was gyrated on a rotary shaker at a speed of 83 rpm so that a gyrating width (diameter) drew a circle of 25 mm along a horizontal plane, and suspension culture was continued at 37° C. in a 5% $CO_2$ environment. Phase-contrast images of the cell aggregates were acquired using a phase-contrast microscope on day 5 of the culture and day 10 of the culture. FIG. 12 shows the results.

Example 2: Suspension Culture of Human iPS Cell Line RPChiPS771-2 Under Condition in which Secretion of WNT Protein is Inhibited (Step 1: Maintenance Culture of Human iPS Cell Line RPChiPS771-2)

A human iPS cell line RPChiPS771-2 was maintenance-cultured by the same method as in Step 1 of Reference Example 1.

(Step 2: Suspension Culture of Human iPS Cell Line RPChiPS771-2)

Figure 13:
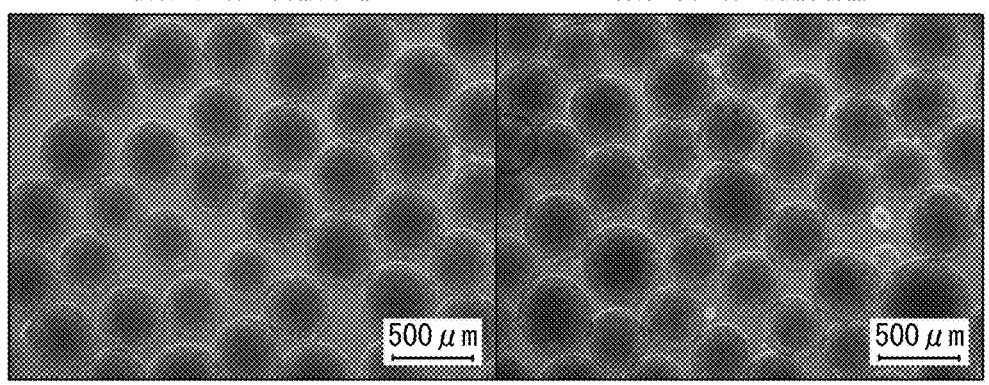
FIG. 13 shows phase-contrast images on day 5 and day 10 when the human iPS cell line RPChiPS771-2 was suspension-cultured in a state where extracellular WNT protein secretion was inhibited.

Suspension culture was performed under a condition in which an amount of WNT protein contained in a unit of a medium in contact with a unit area of a cell surface was maintained at $2.9 \times 10^2$ μg/mL·cm² or less. Specifically, the human iPS cell line RPChiPS771-2 maintenance-cultured in Step 1 of Example 2 was suspension-cultured by the same method as in Step 2 of Example 1. Phase-contrast images of the cell aggregates were acquired using a phase-contrast microscope on day 5 of the culture and day 10 of the culture. FIG. 13 shows the results.

Example 3: Quantitative Real-Time PCR Analysis and ELISA Analysis

Quantitative real-time PCR analysis was performed on the cell populations obtained in Example 1 and Example 2 by the same method as in Comparative Example 3. Table 5 shows results of measuring gene expression.

TABLE 5

| | Relative gene expression level with respect to ACTB in $2^{-\Delta Ct}$ | | | | |
|---|---|---|---|---|---|
| | OCT4 | SOX2 | Nanog | Brachyury | SOX17 |
| Example 1 | $1.77 \times 10^{-1}$ | $2.83 \times 10^{-2}$ | $1.30 \times 10^{-2}$ | — | — |
| Example 2 | $5.72 \times 10^{-1}$ | $2.31 \times 10^{-2}$ | $8.16 \times 10^{-1}$ | — | — |

In both of Example 1 and Example 2, gene expression of Brachyury and SOX17, which are differentiation marker genes, was not detected, and undifferentiation-deviated cells did not appear.

By the same method as in Comparative Example 3, ELISA analysis of WNT3A protein was performed on the culture supernatants on day 5 of the culture obtained in Example 1 and Example 2, and a concentration of WNT3A protein in the medium on day 5 of the culture, and an amount of WNT3A protein of the cells on day 5 of the culture were analyzed. Table 6 shows the calculated concentration of the WNT3A protein contained in the medium and amount of the WNT3A protein in the cells.

TABLE 6

| | Concentration of WNT3A protein contained in medium (pg/mL) | Amount of WNT3A protein per $10^4$ cells (pg/$10^4$ cells) |
|---|---|---|
| Example 1 | 83.9 | 0.68 |
| Example 2 | 53.3 | 0.37 |

In both of Example 1 and Example 2, an amount of WNT3A protein of the cells was 1.0 pg/$10^4$ cells or less. That is, it was found that, in the case of suspension culture, when suspension culture is performed while an amount of WNT protein of the cells is 1.0 pg/$10^4$ cells or less in the medium, it is possible to acquire a homogeneous pluripotent stem cell population in which an undifferentiated state is maintained.

Example 4: Calculation of Amount of WNT Protein Contained in Unit of Medium in Contact with Unit Area of Cell Surface in Suspension Culture Based on the analysis results of Comparative Example 3, since WNT protein is accumulated in the inside of the cell aggregates at a high concentration in the suspension culture, it was suggested that a concentration of WNT3A protein contained in the medium is not sufficient as an index for undifferentiation maintenance, and an amount of WNT protein contained in a unit of a medium in contact with a unit area of a cell surface is important for undifferentiation maintenance. Accordingly, regarding an amount of WNT protein contained in a unit of a medium in contact with a unit area of a cell surface, a range within which undifferentiation can be maintained in suspension culture was calculated by the following procedure.

(Step 1: Calculation of Relational Expression Between Diameter of Cell Aggregate and Number of Cells Contained in One Cell Aggregate)

Suspension culture was performed until day 5 of the culture by the same method as in Comparative Example 1, and Comparative Example 2, Example 1, and Example 2. On day 5 of the culture, the number of living cells was measured and images of cell aggregates were acquired. Furthermore, on day 5 of the culture, the number of the cell aggregates was measured with a phase-contrast microscope. The images of the cell aggregates were analyzed with image analysis software (for example, ImageJ), and diameters of the cell aggregates were measured. Diameters of ten cell aggregates were measured for each culture condition, and average diameters thereof were calculated. Furthermore, using the number of living cells and the number of cell aggregates which were measured on day 5 of the culture, the number of cells (cells/aggregate) contained in one cell aggregate was calculated according to the following equation.

(Number of cells contained in one cell aggregate)= (number of living cells)/(number of cell aggregates)

Table 7 shows the measured average diameters of the cell aggregates and the number of cells contained in one cell aggregate.

TABLE 7

| Average diameter of cell aggregates (μm) | Number of cells contained in one cell aggregate (cells/aggregate) |
|---|---|
| 171.0 | 110 |
| 192.5 | 192 |
| 349.8 | 1150 |
| 439.8 | 1660 |

Figure 14:
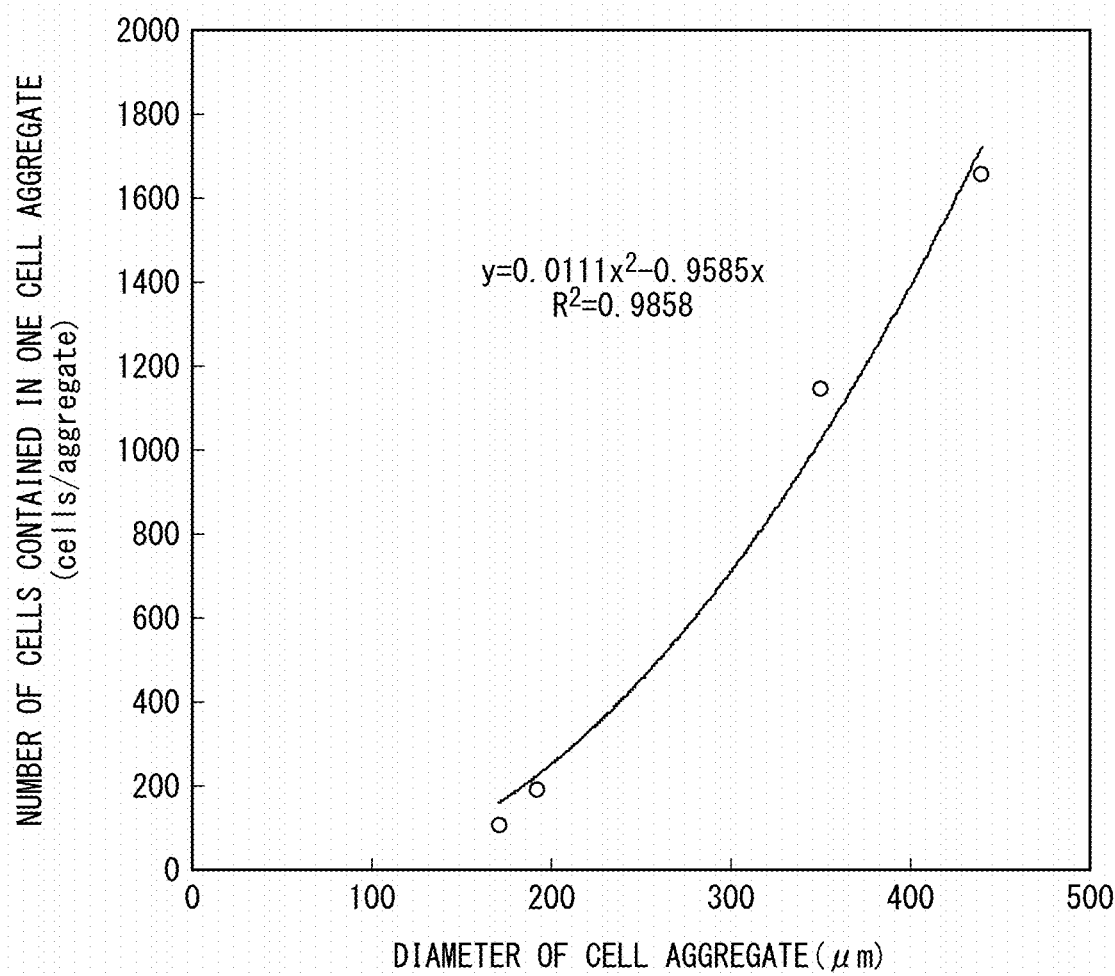
FIG. 14 shows a relationship between a diameter of a cell aggregate and the number of cells contained in one cell aggregate.

The average diameters of the cell aggregate and the number of cells contained in one cell aggregate were plotted on a graph, and an approximate curve was created by a quadratic approximation. FIG. 14 shows the plotted graph. As a result, the relationship between the diameters of the cell aggregates and the number of cells contained in one cell aggregate was expressed by the following approximate expression.

(Number of cells contained in one cell aggregate)=0.111×(diameter of cell aggregates)$^2$−0.9585×(diameter of cell aggregates)

(Step 2: Calculation of Surface Area in Contact with Medium Per Cell)

The images of cell aggregates on day 5 of the culture, which were obtained in Comparative Example 1, Comparative Example 2, Example 1, and Example 2, were analyzed with image analysis software (for example, ImageJ), and diameters of the cell aggregates were measured. For each of Comparative Example 1, Comparative Example 2, Example 1, and Example 2, diameters of ten cell aggregates were measured, and average diameters thereof were calculated. Using the approximate expression calculated in Step 1 of Example 4, the number of cells contained in one cell aggregate was calculated from the average diameters of the cell aggregates in Comparative Example 1, Comparative Example 2, Example 1, and Example 2. Furthermore, assuming that the cell aggregate is a sphere, a volume of the cell aggregate was calculated from the average diameters of the cell aggregates. Furthermore, assuming that a filling rate of cells contained in the cell aggregates is 100%, a volume of one cell was calculated from the volume of the cell aggregate and the number of cells contained in the one cell aggregate. Assuming that cells contained in the cell aggregate are spheres, a diameter of one cell was calculated from the volume of one cell. Then, a surface area of one cell was calculated from the diameter of one cell, and was used as a surface area in contact with the medium per cell. The calculation of each of the values was performed according to the following equations.

(Volume of cell aggregate)=4/3×π(pi)×((diameter of cell aggregate)/2)$^3$ (Volume of one cell)=(volume of cell aggregate)/ (number of cells contained in one cell aggregate)

(Diameter of one cell)=2×(3/(4×π)×(volume of one cell))$^{1/3}$ (Surface area in contact with medium per cell)=4× π×((diameter of one cell)/2)$^2$ (Step 3: Calculation of Amount of WNT Protein Contained in Unit of Medium in Contact with Unit Area of Cell Surface)

Regarding the suspension culture, an amount of WNT protein contained in a unit of a medium in contact with a unit area of a cell surface was calculated from the concentration, which was measured in Comparative Example 3 and Example 3, of WNT3A protein contained in the medium and from the surface area, which was calculated in Step 2 of Example 4, in contact with the medium per cell. The calculation of these values was performed according to the following equations.

(Amount of WNT3A protein contained in unit of medium in contact with unit area of cell surface)=(concentration of WNT3A protein contained in medium)/(surface area in contact with medium per cell)

Table 8 shows the amount of WNT protein contained in the unit of the medium in contact with the unit area of the cell surface of Comparative Example 1, Comparative Example 2, Example 1, and Example 2.

TABLE 8

| | Amount of WNT3A protein contained in unit of medium in contact with unit area of cell surface (μg/mL · cm$^2$) | |
|---|---|---|
| | Average value (n = 10) | Standard deviation (n = 10) |
| Comparative Example 1 | $1.1 \times 10^3$ | 4.9 |
| Comparative Example 2 | $3.3 \times 10^2$ | 26 |
| Example 1 | $2.7 \times 10^2$ | 2.2 |
| Example 2 | $1.4 \times 10^2$ | 4.4 |

In both of Example 1 and Example 2, an amount of WNT3A protein contained in the unit of the medium in contact with the unit area of the cell surface was $2.9 \times 10^2$ μg/mL·cm$^2$ or less. That is, it was found that, when the suspension culture is performed so that the amount of WNT3A protein contained in the unit of the medium in contact with the unit area of the cell surface is $2.9 \times 10^2$ μg/mL·cm$^2$ or less, it is possible to acquire a homogeneous pluripotent stem cell population in which an undifferentiated state is maintained. Furthermore, it became clear that, regarding the amount of WNT3A protein contained in the unit of the medium in contact with the unit area of the cell surface, a range within which undifferentiation can be maintained is significantly different in the cases of the adhesion culture of Reference Example 3 and the suspension culture of Example 4.

Example 5: Flow Cytometry Analysis

Flow cytometry analysis was performed by the following procedure on the cells on day 10 of the culture which were obtained in Reference Example 1, Reference Example 2, Comparative Example 1, Comparative Example 2, Example 1, and Example 2. Homogeneity of the obtained cell population was evaluated.

Cells on day 10 of the culture were treated with Accutase for 3 minutes to 10 minutes, dispersed into single cells by pipetting, and suspended in PBS (−). A part of this cell suspension was stained with trypan blue, and the number of living cells was measured. Based on the number of living cells, $2\times10^6$ cells were separated and washed with PBS (−). Thereafter, the cells were fixed with 4% paraformaldehyde (PFA) at room temperature for 20 minutes, and thereafter washed with PBS (−) three times. Permeation treatment was performed with cold methanol at −20° C. overnight. After washing three times with PBS (−). the cells were blocked with 3% fetal bovine serum (FBS)/PBS (−). Thereafter, a sample of the cells was dispensed into two samples, and each thereof was suspended in 50 μL using 3% fetal bovine serum (FBS)/PBS (−). An Oct4 antibody, an SOX2 antibody, or a Nanog antibody was added to one of the dispensed samples, and an isotype control antibody was added to the other. Table 9 shows the antibodies used and their amounts added. After adding each of the antibodies, they were mixed and stained at 4° C. for 1 hour.

TABLE 9

|  | Manufacturer and No. | Amount added |
|---|---|---|
| Fluorescently labeled anti-OCT4 antibody | BioLegend, Inc., 653704 | 5 μL |
| Fluorescently labeled anti-SOX2 antibody | BioLegend, Inc., 656110 | 5 μL |
| Fluorescently labeled anti-Nanog antibody | BioLegend, Inc., 674010 | 5 μL |
| Fluorescently labeled OCT4 isotype control antibody | BioLegend, Inc., 400314 | 0.625 μL |
| Fluorescently labeled SOX2 isotype control antibody | BioLegend, Inc., 400129 | 0.625 μL |
| Fluorescently labeled Nanog isotype control antibody | BioLegend, Inc., 400130 | 0.625 μL |

Figure 15:
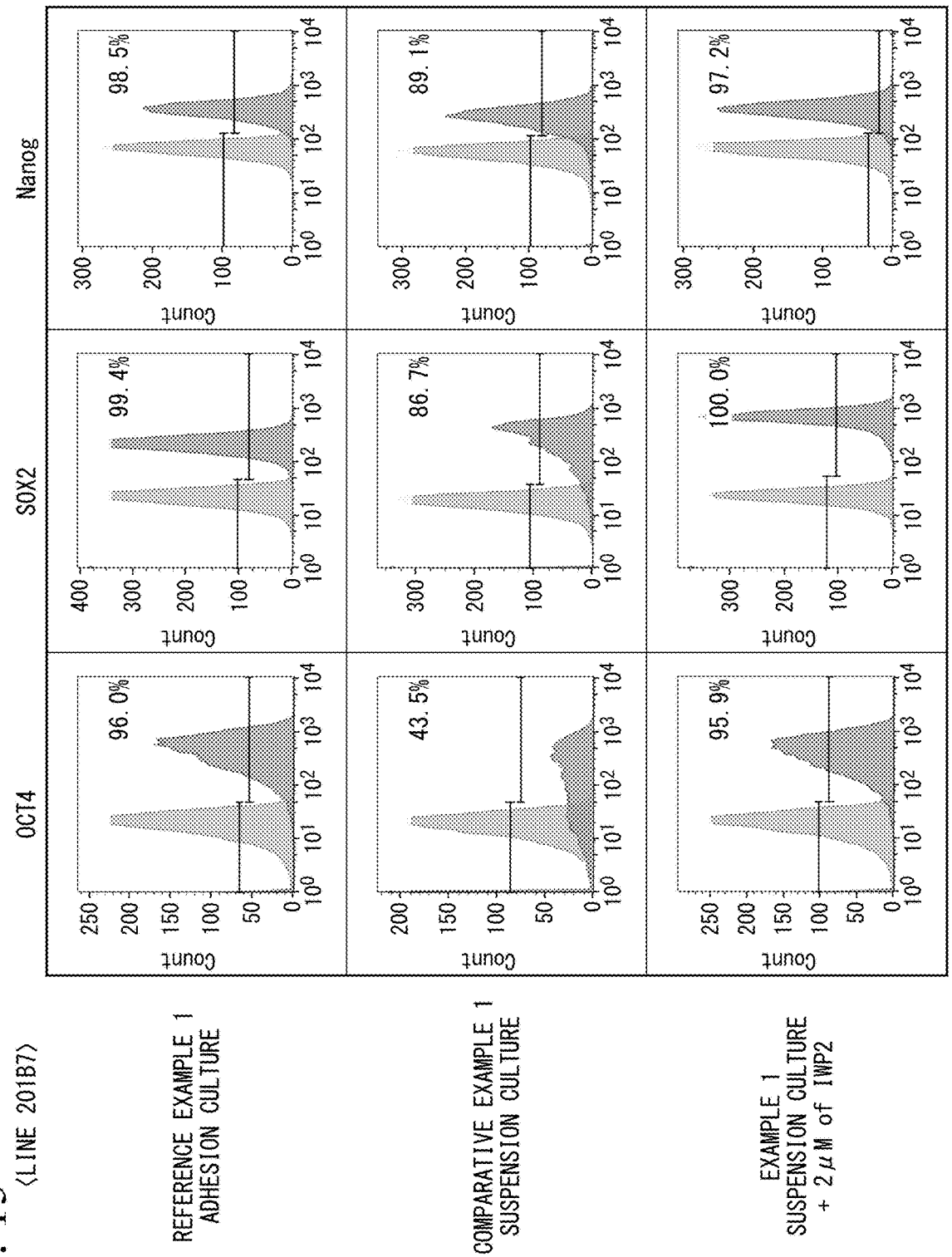
FIG. 15 shows results of measuring expression of OCT4, SOX2, and Nanog, which are undifferentiation markers, when the human iPS cell line 201B7 was cultured.
Figure 16:
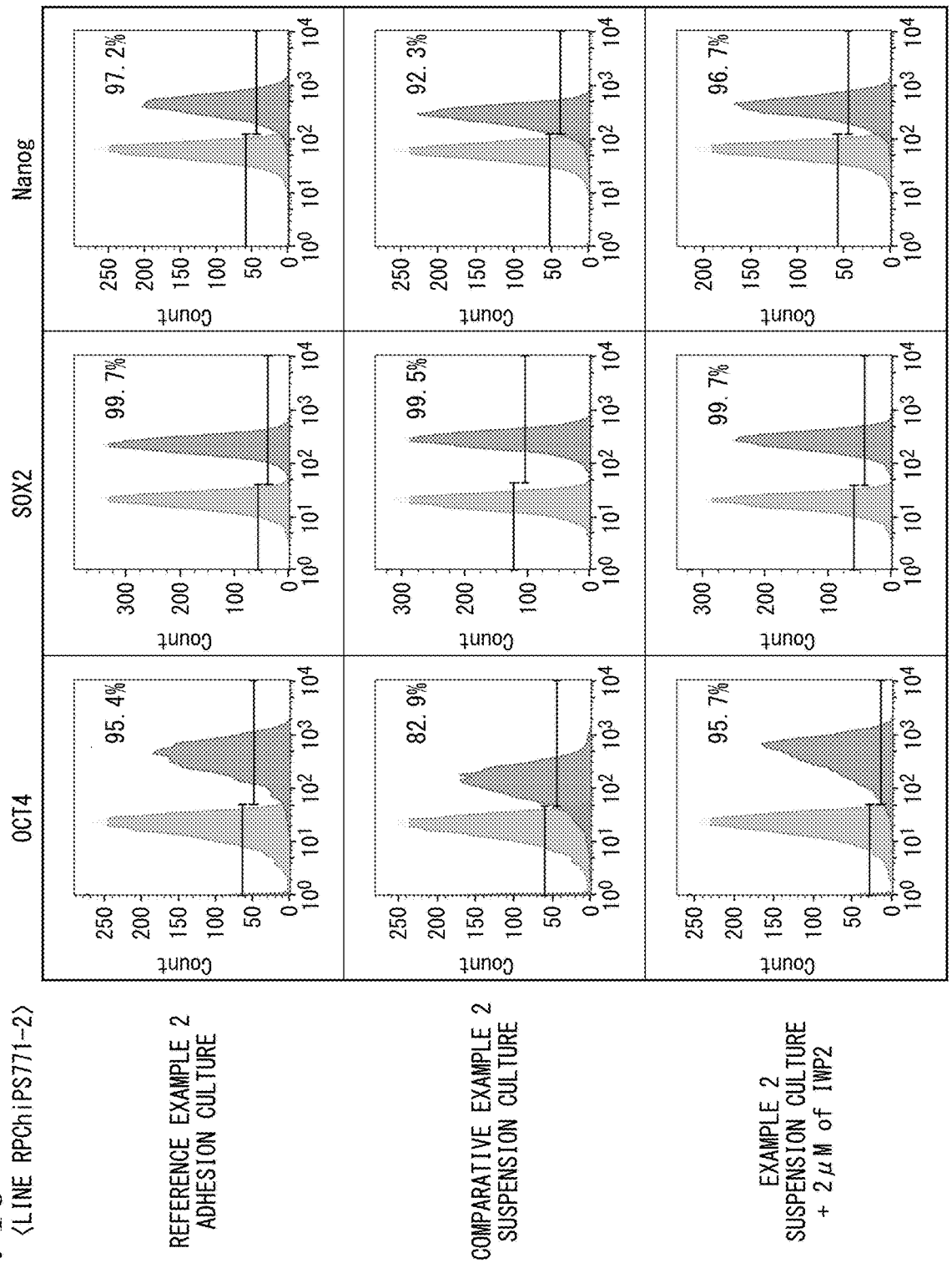
FIG. 16 shows results of measuring expression of OCT4, SOX2, and Nanog, which are undifferentiation markers, when the human iPS cell line RPChiPS771-2 was cultured.

After washing once with 3% fetal bovine serum (FBS)/PBS (−), the cells caused to pass through a cell strainer were analyzed with Guava easyCyte 8HT (Merck K.K.). Table 10 and FIGS. 15 and 16 show the results.

TABLE 10

| Cell line | Culture form | Percentage of cells positive for OCT4 (%) | Percentage of cells positive for SOX2 (%) | Percentage of cells positive for Nanog (%) |
|---|---|---|---|---|
| Reference Example 1 | Line 201B7 | Adhesion culture | 96.0 | 99.4 | 98.5 |
| Comparative Example 1 | Line 201B7 | Suspension culture | 43.5 | 86.7 | 89.1 |
| Example 1 | Line 201B7 | Suspension culture + IWP-2 | 95.9 | 100.0 | 97.2 |
| Reference Example 2 | Line RPChiPS771-2 | Adhesion culture | 95.4 | 99.7 | 97.2 |
| Comparative Example 2 | Line RPChiPS771-2 | Suspension culture | 82.9 | 99.5 | 92.3 |
| Example 2 | Line RPChiPS771-2 | Suspension culture + IWP-2 | 95.7 | 99.7 | 96.7 |

In Reference Example 1 and Reference Example 2 in which adhesion culture was performed, a percentage of cells positive for OCT4, SOX2, or Nanog, which are undifferentiation markers, was 95% or more. Because these percentages decreased in Comparative Example 1 and Comparative Example 2 in which suspension culture was performed, it was found that undifferentiation-deviated cells appeared and homogeneity of the cell population decreased. In Example 1 and Example 2 in which suspension culture was performed under the condition in which an amount of WNT protein contained in the unit of the medium in contact with the unit area of the cell surface was maintained at $2.9\times10^2$ ug/mL·cm² or less, a percentage of cells positive for OCT4, SOX2, or Nanog, which are undifferentiation markers, was 95% or more, and thereby appearance of undifferentiation-deviated cells was inhibited and a homogeneous cell population was obtained. That is, it became clear that a homogeneous pluripotent stem cell population can be acquired when suspension culture is performed under the condition in which an amount of WNT protein contained in the unit of the medium in contact with the unit area of the cell surface is maintained at $2.9\times10^2$ μg/mL·cm² or less.

Comparative Example 4: Induction of Differentiation into Three Germ Layer Cells

Induction of differentiation of pluripotent stem cells was performed by the following procedure. For all culture days in the following steps, the start date of suspension culture in Step 1 is counted as day 0.

(Step 1: Preparation of Pluripotent Stem Cell Population)

Suspension culture was performed by the same method as in Comparative Example 1, and on day 10 of the culture, cell aggregates and a culture supernatant were recovered in a centrifuge tube from wells. The centrifuge tube was left to stand for about 5 minutes to precipitate the cell aggregates. Thereafter, the culture supernatant was removed. 1 mL of Accutase was added to the cell aggregates to treat them for 10 minutes. The cell aggregates were dispersed into single cells by pipetting. These cells were suspended in a StemFit™ AK02N medium containing Y-27632 at a final concentration of 10 μM. A part of the cells was stained with trypan blue to measure the number of living cells. A cell suspension was prepared so that it contained $2\times10^5$ cells per mL using the StemFit™ AK02N medium containing Y-27632 a final concentration of 10 μM. 4 mL of the cell suspension per well was seeded in a 6-well plate for suspension culture. The plate in which the cells were seeded was gyrated on a rotary shaker at a speed of 83 rpm so that a gyrating width (diameter) drew a circle of 25 mm along a horizontal plane, and suspension culture was continued at 37° C. in a 5% $CO_2$ environment until day 12 of the culture. On day 11 of the culture, medium exchange was performed with a StemFit™ AK02N medium containing Y-2763₂ at a final concentration of 5 μM. The medium exchange was performed by recovering a total amount of the medium containing the cell aggregates in a centrifuge tube and leaving the medium to stand for about 5 minutes to precipitate the cell aggregates, thereafter, removing the culture supernatant, gently suspending the cell aggregates again in a fresh medium, and returning the cell aggregates to the original wells.

In the suspension culture of Step 1, the amount of WNT3A protein contained in the unit of the medium in contact with the unit area of the cell surface is thought to be at the same level as that of Comparative Example 1. That is, in the suspension culture, the amount of WNT3A protein contained in the unit of the medium in contact with the unit area of the cell surface is not maintained at $2.9\times10^2$ μg/mL·cm² or less. Furthermore, the amount of WNT3A protein in pluripotent stem cells in the medium is not maintained at 1.0 pg/$10^4$ cells or less.

(Step 2-A: Induction of Differentiation into Endoderm)

After Step 1 above, induction of differentiation into endoderm was performed. On day 12 and day 13 of the culture, medium exchange was performed with a medium 1 for induction of differentiation into endoderm shown in Table 11. On day 14 of the culture, medium exchange was performed with a medium 2 for induction of differentiation into endoderm shown in Table 11. On day 15 of the culture, medium exchange was performed with a medium 3 for induction of differentiation into endoderm shown in Table 11. The medium exchange was performed by recovering a total amount of the medium containing the cell aggregates in a centrifuge tube and leaving the medium to stand for about 5 minutes to precipitate the cell aggregates, thereafter, removing the culture supernatant, gently suspending the cell aggregates again in a fresh medium, and returning the cell aggregates to the original wells. Thereafter, the suspension culture was continued until day 16 of the culture to prepare a cell sample obtained by induction of differentiation into endoderm.

TABLE 11

| | Medium composition (manufacturer/No.) |
|---|---|
| Medium 1 for induction of differentiation into endoderm | RPMI 1640 medium (FUJIFILM Wako Pure Chemical Corporation/189-02025) 0.25 vol % BSA (FUJIFILM Wako Pure Chemical Corporation/017-22231) 1 mM sodium pyruvate (FUJIFILM Wako Pure Chemical Corporation/190-14881) 1 vol % MEM non-essential amino acid solution (FUJIFILM Wako Pure Chemical Corporation/139-15651) 55 μM 2-Mercaptoethanol (Thermo Fisher Scientific K.K./21985023) 80 ng/mL Activin A (R&D Systems, Inc./338-AC) 50 ng/mL FGF-2 (PeproTech, Inc./AF-100-18) 20 ng/mL BMP-4 (Miltenyi Biotec LLC./130-111-168) 3 μM CHIR 99021 (FUJIFILM Wako Pure Chemical Corporation/038-23101) |
| Medium 2 for induction of differentiation into endoderm | RPMI 1640 medium (FUJIFILM Wako Pure Chemical Corporation/189-02025) 0.25 vol % BSA (FUJIFILM Wako Pure Chemical Corporation/017-22231) 1 mM sodium pyruvate (FUJIFILM Wako Pure Chemical Corporation/190-14881) 1 vol % MEM non-essential amino acid solution (FUJIFILM Wako Pure Chemical Corporation/139-15651) 55 μM 2-Mercaptoethanol (Thermo Fisher Scientific K.K./21985023) 80 ng/mL Activin A (R&D Systems, Inc./338-AC) |
| Medium 3 for induction of differentiation into endoderm | RPMI 1640 medium (FUJIFILM Wako Pure Chemical Corporation/189-02025) 0.25 vol % BSA (FUJIFILM Wako Pure Chemical Corporation/017-22231) 1 mM sodium pyruvate (FUJIFILM Wako Pure Chemical Corporation/190-14881) 1 vol % MEM non-essential amino acid solution (FUJIFILM Wako Pure Chemical Corporation/139-15651) 55 μM 2-Mercaptoethanol (Thermo Fisher Scientific K.K./21985023) 80 ng/mL Activin A (R&D Systems, Inc./338-AC) 0.5 vol % KSR (Thermo Fisher Scientific K.K./10828028) |

(Step 2-B: Induction of Differentiation into Mesoderm)

After Step 1 above, induction of differentiation into mesoderm was performed. On day 12 of the culture, medium exchange was performed with a medium 1 for induction of differentiation into mesoderm shown in Table 12. On day 13 of the culture, medium exchange was performed with a medium 2 for induction of differentiation into mesoderm shown in Table 12. The medium exchange was performed by recovering a total amount of the medium containing the cell aggregates in a centrifuge tube and leaving the medium to stand for about 5 minutes to precipitate the cell aggregates, thereafter, removing the culture supernatant, gently suspending the cell aggregates again in a fresh medium, and returning the cell aggregates to the original wells. Thereafter, the suspension culture was continued until day 15 of the culture to prepare a cell sample obtained by induction of differentiation into mesoderm.

TABLE 12

| | Medium composition (manufacturer/No.) |
|---|---|
| Medium 1 for induction of differentiation into mesoderm | RPMI 1640 medium (FUJIFILM Wako Pure Chemical Corporation/189-02025) 2 vol % B-27 Plus Supplement (Thermo Fisher Scientific K.K./A3582801) 3 μM CHIR 99021 (FUJIFILM Wako Pure Chemical Corporation/038-23101) |
| Medium 2 for induction of differentiation into mesoderm | RPMI 1640 medium (FUJIFILM Wako Pure Chemical Corporation/189-02025) 2 vol % B-27 Plus Supplement (Thermo Fisher Scientific K.K./A3582801) |

(Step 2-C: Induction of Differentiation into Ectoderm)

After Step 1 above, induction of differentiation into ectoderm was performed. From day 12 to day 16 of the culture, medium exchange was performed every day with a medium for induction of differentiation into ectoderm shown in Table 13. The medium exchange was performed by recovering a total amount of the medium containing the cell aggregates in a centrifuge tube and leaving the medium to stand for about 5 minutes to precipitate the cell aggregates, thereafter, removing the culture supernatant, gently suspending the cell aggregates again in a fresh medium, and returning the cell aggregates to the original wells. Thereafter, the suspension culture was continued until day 17 of the culture to prepare a cell sample obtained by induction of differentiation into ectoderm.

TABLE 13

| | Medium composition (manufacturer/No.) |
|---|---|
| Medium for induction of differentiation into ectoderm | KnockOut DMEM/F-12 medium (Thermo Fisher Scientific K.K./12660012) + Neurobasal medium (Thermo Fisher Scientific K.K./21103049) (1:1 blending) 1 vol % GlutaMAX Supplement (Thermo Fisher Scientific K.K./35050061) 0.1 mM L-ascorbic acid (FUJIFILM Wako Pure Chemical Corporation/100769) 1 vol % MEM non-essential amino acid solution (FUJIFILM Wako Pure Chemical Corporation/139-15651) 2 μM SB431542 (FUJIFILM Wako Pure Chemical Corporation/192-16541) 1 μM Dorsomorphin dihydrochloride (FUJIFILM Wako Pure Chemical Corporation/047-33763) 3 μM CHIR 99021 (FUJIFILM Wako Pure Chemical Corporation/038-23101) |

Example 6: Induction of Differentiation into Three Germ Layer Cells

Induction of differentiation of pluripotent stem cells was performed by the following procedure.

(Step 1: Preparation of Pluripotent Stem Cell Population)

A pluripotent stem cell population was prepared by the same method as in Step 1 of Comparative Example 4 except the point that the suspension culture was performed by the same method as in Example 1 until day 10 of the culture, and the point that IWP-2 was added, so that a final concentration was 2 μM, to a seeding medium on day 10 of the culture and a medium for medium exchange on day 11 of the culture.

In the suspension culture of Step 1, the amount of WNT3A protein contained in the unit of the medium in contact with the unit area of the cell surface is thought to be at the same level as that of Example 1. That is, in the suspension culture, the amount of WNT3A protein contained in the unit of the medium in contact with the unit area of the cell surface is maintained at $2.9 \times 10^2$ μg/mL·cm$^2$ or less. Furthermore, the amount of WNT3A protein in pluripotent stem cells in the medium is maintained at 1.0 pg/10$^4$ cells or less.

(Step 2-A: Induction of Differentiation into Endoderm)

After Step 1 above, induction of differentiation into endoderm was performed in the same procedure as in Step 2-A of Comparative Example 4.

(Step 2-B: Induction of Differentiation into Mesoderm)

After Step 1 above, induction of differentiation into mesoderm was performed in the same procedure as in Step 2-B of Comparative Example 4.

(Step 2-C: Induction of Differentiation into Ectoderm)

After Step 1 above, induction of differentiation into ectoderm was performed in the same procedure as in Step 2-C of Comparative Example 4.

Example 7: Comparison of Differentiation Induction Efficiency by Quantitative Real-Time PCR Analysis The cell populations induced to differentiate into three germ layer cells in Comparative Example 4 and Example 6 were subjected to quantitative real-time PCR analysis by the same procedure as in Comparative Example 3.

Base sequences of primers used in the quantitative real-time PCR analysis of the samples obtained by induction of differentiation into endoderm are shown below.

```
ACTB (F):
                                     (SEQ ID NO: 1)
5'-CCTCATGAAGATCCTCACCGA-3'

ACTB (R):
                                     (SEQ ID NO: 2)
5'-TTGCCAATGGTGATGACCTGG-3'

SOX17 (F):
                                     (SEQ ID NO: 11)
5'-ATCTGCACTTCGTGTGCAAG-3'

SOX17 (R):
                                     (SEQ ID NO: 12)
5'-GAGTCTGAGGATTTCCTTAGCTC-3'

FOXA2 (F):
                                     (SEQ ID NO: 13)
5'-GGTGATTGCTGGTCGTTTGTTGTG-3'

FOXA2 (R):
                                     (SEQ ID NO: 14)
5'-GCCGACATGCTCATGTACGTGTT-3'

CXCR4 (F):
                                     (SEQ ID NO: 15)
5'-ACTGAGAAGCATGACGGACAAG-3'

CXCR4 (R):
                                     (SEQ ID NO: 16)
5'-AGGTAGCGGTCCAGACTGATG-3'
```

Base sequences of primers used in the quantitative real-time PCR analysis of the samples obtained by induction of differentiation into mesoderm are shown below.

```
ACTB (F):
                                     (SEQ ID NO: 1)
5'-CCTCATGAAGATCCTCACCGA-3'

ACTB (R):
                                     (SEQ ID NO: 2)
5'-TTGCCAATGGTGATGACCTGG-3'

CDX2 (F):
                                     (SEQ ID NO: 17)
5'-CACCCACAGCCATAGACCTAC-3'

CDX2 (R):
                                     (SEQ ID NO: 18)
5'-GTCAGTCCAGGCAATGCTTC-3'

CXCR4 (F):
                                     (SEQ ID NO: 15)
5'-ACTGAGAAGCATGACGGACAAG-3'

CXCR4 (R):
                                     (SEQ ID NO: 16)
5'-AGGTAGCGGTCCAGACTGATG-3'

VEGFR2 (F):
                                     (SEQ ID NO: 19)
5'-AGCCAAGCTGTCTCAGTGAC-3'

VEGFR2 (R):
                                     (SEQ ID NO: 20)
5'-TCTCCCGACTTTGTTGACCG-3'

PDGFRα (F):
                                     SEQ ID NO: 21)
5'-GCTGAGCCTAATCCTCTGCC-3'

PDGFRα (R):
                                     (SEQ ID NO: 22)
5'-ACTGCTCACTTCCAAGACCG-3'
```

Base sequences of primers used in the quantitative real-time PCR analysis of the samples obtained by induction of differentiation into ectoderm are shown below.

```
ACTB (F):
                                     (SEQ ID NO: 1)
5'-CCTCATGAAGATCCTCACCGA-3'

ACTB (R):
                                     (SEQ ID NO: 2)
5'-TTGCCAATGGTGATGACCTGG-3'

PAX6 (F):
                                     (SEQ ID NO: 23)
5'-AGGAATGGACTTGAAACAAGG-3'

PAX6 (R):
                                     (SEQ ID NO: 24)
5'-GCAAAGCTTGTTGATCATGG-3'
```

```
-continued
SOX1 (F):
                                    (SEQ ID NO: 25)
5'-AGGCAGGTCCAAGCACTTAC-3'

SOX1 (R):
                                    (SEQ ID NO: 26)
5'-ATAACTCCGCCGTCTGAAGG-3'

NESTIN (F):
                                    (SEQ ID NO: 27)
5'-TCAAGCACCACTGTGGACTC-3'

NESTIN (R):
                                    (SEQ ID NO: 28)
5'-AGGTTCCATGCTCCCAGAGA-3'
```

Figure 17:
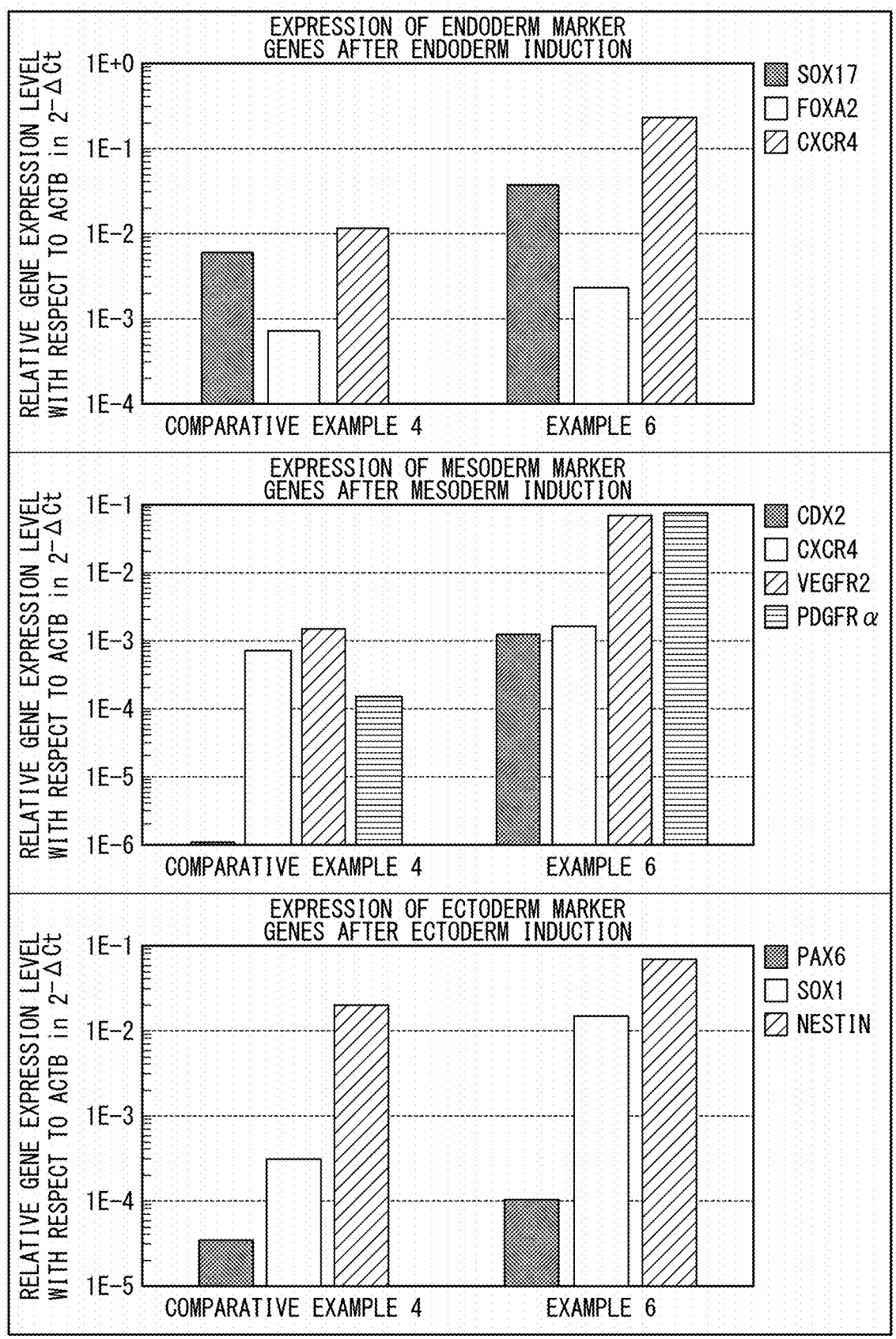
FIG. 17 shows results of measuring gene expression of endoderm markers, mesoderm markers, and ectoderm markers after inducing differentiation from the human iPS cell line 201B7 into three germ layer cells.

Tables 14 to 16 and FIG. 17 show results of measuring gene expression levels.

TABLE 14

| | Relative gene expression level with respect to ACTB in $2^{-\Delta Ct}$ | | |
|---|---|---|---|
| | SOX17 | FOXA2 | CXCR4 |
| Comparative Example 4 (induction of differentiation into endoderm) | $5.80 \times 10^{-3}$ | $7.09 \times 10^{-4}$ | $1.14 \times 10^{-2}$ |
| Example 6 (induction of differentiation into endoderm) | $3.61 \times 10^{-2}$ | $2.38 \times 10^{-3}$ | $2.24 \times 10^{-1}$ |

TABLE 15

| | Relative gene expression level with respect to ACTB in $2^{-\Delta Ct}$ | | | |
|---|---|---|---|---|
| | CDX2 | CXCR4 | VEGFR2 | PDGFRα |
| Comparative Example 4 (induction of differentiation into mesoderm) | $1.07 \times 10^{-6}$ | $7.21 \times 10^{-4}$ | $1.56 \times 10^{-3}$ | $1.48 \times 10^{-4}$ |
| Example 6 (induction of differentiation into mesoderm) | $1.23 \times 10^{-3}$ | $1.64 \times 10^{-3}$ | $7.00 \times 10^{-2}$ | $7.35 \times 10^{-2}$ |

TABLE 16

| | Relative gene expression level with respect to ACTB in $2^{-\Delta Ct}$ | | |
|---|---|---|---|
| | PAX6 | SOX1 | NESTIN |
| Comparative Example 4 (induction of differentiation into ectoderm) | $3.51 \times 10^{-5}$ | $3.18 \times 10^{-4}$ | $2.01 \times 10^{-2}$ |
| Example 6 (induction of differentiation into ectoderm) | $1.07 \times 10^{-4}$ | $1.54 \times 10^{-2}$ | $6.91 \times 10^{-2}$ |

Example 6 showed a tendency in which expression levels of the endoderm differentiation marker genes (SOX17, FOXA2, and CXCR4) after the induction of differentiation into endoderm were higher as compared to Comparative Example 4. Furthermore, similarly, Example 6 showed a tendency in which expression levels of the mesoderm differentiation marker genes (CDX2, CXCR4, VEGFR2, and PDGFRα) after the induction of differentiation into mesoderm, and expression levels of ectoderm differentiation marker genes (PAX6, SOX1, and NESTIN) after the induction of differentiation into ectoderm were higher as compared to Comparative Example 4.

Based on these results, it became clear that efficiency of inducing differentiation into three germ layer cells increased by preparing a pluripotent stem cell population under the condition in which the amount of WNT protein contained in the unit of the medium in contact with the unit area of the cell surface was maintained at $2.9 \times 10^2$ μg·mLcm² or less.

Example 7: Induction of Differentiation into Three Germ Layer Cells

Regarding the cells on day 10 of the culture which were obtained in Reference Example 1, Reference Example 2, Comparative Example 1, Comparative Example 2, Example 1, and Example 2, it is possible to induce the cells to differentiate into three germ layer cells by the following procedure disclosed in Sundari Chetty et al., Nature Methods 10 (6): 553-556, January 2013.

(Step 1: Preparation of Cells to be Induced to Differentiate)

The cells on day 10 of the culture which were obtained in Reference Example 1, Reference Example 2, Comparative Example 1, Comparative Example 2, Example 1, and Example 2 were treated with Accutase for 3 to 10 minutes and dispersed into single cells by pipetting. These cells were suspended in an MEF-conditioned medium containing Y-27632 at a final concentration of 10 μM and bFGF (Thermo Fisher Scientific K.K.) at a final concentration of 20 ng/mL. A part of the cells was stained with trypan blue to measure the number of living cells. A cell suspension was prepared so that it contained $5 \times 10^5$ cells per mL using the MEF-conditioned medium containing Y-27632 at a final concentration of 10 μM and bFGF at a final concentration of 20 ng/mL. 2 mL of the cell suspension per well was seeded on a 6-well plate for cell culture coated with Growth factor Reduced Matrigel (BD Biosciences), and adhesion culture was performed at 37° C. in a 5% $CO_2$ environment. The day on which the cells were seeded was defined as day 0 of the culture. On day 1 of the culture, medium exchange was performed with a MEF-conditioned medium containing bFGF at a final concentration of 20 ng/mL.

(Step 2-A: Induction of Differentiation into Ectoderm Cells)

For the cells prepared in Step 1 of Example 7, medium exchange was performed on day 2 of the culture with KnockOut-DMEM (Thermo Fisher Scientific K.K.) containing knockout serum replacement (Thermo Fisher Scientific K.K.) at a final concentration of 10%, Noggin (R&D Systems, Inc.) at a final concentration of 500 ng/mL, and SB431542 (Tocris Bioscience) at a final concentration of 10 μM. Medium exchange was performed using the same medium on day 3 of the culture, and thereby an ectoderm cell population could be obtained on day 4 of the culture.

(Step 2-B: Induction of Differentiation into Mesoderm Cells)

For the cells prepared in Step 1 of Example 7, medium exchange was performed on day 2 of the culture with an RPMI-B27 (Thermo Fisher Scientific K.K.) medium to which recombinant human Activin A (R&D Systems, Inc.) was added at a final concentration of 100 ng/mL. Medium exchange was performed on days 3, 4, and 5 of the culture with an RPMI-B27 (Thermo Fisher Scientific K.K.) medium to which recombinant human BMP4 (R&D Systems, Inc.)

was added at a final concentration of 10 ng/mL, and thereby a mesoderm cell population could be obtained on day 6 of the culture.

(Step 2-C: Induction of Differentiation into Endoderm Cells)

For the cells prepared in Step 1 of Example 7, medium exchange was performed on day 2 of the culture with an MCDB-131 medium to which NaHCO$_3$ at a final concentration of 2.5 g/L, Glutamax (Thermo Fisher Scientific K.K.) at a final concentration of 1%, glucose at a final concentration of 5.5 mM, FAF-BSA (Proliant Inc. and Lampire Biological Laboratories, Inc.) at a final concentration of 0.1%, ITS: X (Thermo Fisher Scientific K.K.) diluted 50000-fold, WNT3A (R&D Systems, Inc.) at a final concentration of 20 ng/mL, and Activin A at a final concentration of 100 ng/mL were added. Medium exchange was performed on days 3, 4, and 5 of the culture with an MCDB-131 medium to which the above-mentioned additives other than WNT3A were added, and thereby an endoderm cell population could be obtained on day 6 of the culture.

(Step 3: Measurement of Differentiation Induction Efficiency)

The cell populations obtained in Steps 2-A, 2-B, and 2-C were immunofluorescently stained by the following method to obtain efficiency of inducing differentiation into three germ layer cells.

The cells obtained in Steps 2-A, 2-B, and 2-C above were washed with PBS, and thereafter reacted with 4% paraformaldehyde for 30 minutes to immobilize the cells. The cells are washed with PBS. PBS containing donkey serum at a final concentration of 5% and Triton at a final concentration of 0.3% was added. The reaction was allowed at room temperature for 1 hour to perform blocking. Thereafter, a primary antibody was added to each sample so that the antibody was diluted 500-fold, and the reaction was allowed overnight. For primary antibodies, an anti-Sox1 antibody (R&D Systems, Inc.) was used for ectoderm cells, an anti-Brachyury antibody (R&D Systems, Inc.) was used for mesoderm cells, and an anti-Sox17 antibody (R&D Systems, Inc.) was used for endoderm cells. After the primary antibody reaction, the cells are washed with PBS. A secondary antibody labeled with Alexa Fluor 488 or Alexa Fluor 594 corresponding to the primary antibody was added so that the secondary antibody was diluted 500-fold, and the reaction was allowed at room temperature for 1 hour. After the reaction, the cells are washed with PBS. Hoechst 33342 was added so that it was diluted 1000-fold to perform nuclear staining. Using CellInsight CX5 High-Content Screening (HCS) Platform (Thermo Fisher Scientific K.K.), 30 images of immunofluorescently stained cells per well in a 10-fold field of view were acquired. The number of cells was calculated from the number of labeled nuclei in the acquired images, and the number of each of the three germ layer cells was calculated from the number of cells labeled with each of the antibodies. Differentiation induction efficiency could be obtained from the number of each of the three germ layer cells with respect to the number of cells in the visual field.

What is claimed is:

1. A method for producing pluripotent stem cells, the method comprising performing a suspension culture of pluripotent stem cells under a condition in which WNT (Wingless-type MMTV integration site family protein) is present and an amount, which is calculated by the following Equation (1), wherein the calculated WNT protein contained in a unit of a medium in contact with a unit area of a cell surface of a pluripotent stem cell is maintained at $2.9 \times 10^2$ μg/mL·cm$^2$ or less, (amount of WNT protein contained in unit of medium in contact with unit area of cell surface)=(concentration of WNT protein in medium)/(surface area in contact with medium per cell),     (1)

wherein, an amount of WNT protein in the medium per $10^4$ pluripotent stem cells is 1.0 pg/$10^4$ cells or less, the method further comprising forming a cell aggregate by adjusting a seeding density at the start of the suspension culture to a lower limit of $1 \times 10^4$ cells/mL or more and an upper limit of $1 \times 10^7$ cells/mL or less, and wherein WNT protein is secreted from pluripotent stem cells, in the cell aggregate, a percentage of cells positive for OCT4 is 90% or more, a percentage of cells positive for SOX2 is 90% or more, and a percentage of cells positive for Nanog is 90% or more and the pluripotent stem cells include at least one selected from the group consisting of ES (Embryonic Stem) cells and induced pluripotent stem cells.

2. The method according to claim 1, wherein the amount of WNT protein contained in a unit of a medium in contact with a unit area of a cell surface of a pluripotent stem cell reaches $1.0 \times 10^{-5}$ μg/mL·cm² to $2.9 \times 10^{2}$ ug/mL·cm² at the end of culture.

3. The method according to claim 1, wherein the surface area in contact with medium per cell is calculated based on volume of cell aggregate and number of cells contained in one cell aggregate, both volume of cell aggregate and number of cells contained in one cell aggregate being calculated from diameter of cell aggregate and thus based on the diameter of the cell aggregate present in the cultivation suspension, wherein the following assumptions are made in determining an amount of WNT protein contained in a unit of a medium in contact with a unit area of a cell surface of a pluripotent stem cell are made: (1) the cell aggregates are spheres, (2) a volume of the cell aggregate is calculated from the average diameters of the cell aggregates, (3) the filling rate of cells in the cells contained in the cell aggregates is 100%, (4) a volume of one cell was calculated from the volume of the cell aggregate and the number of cells contained in the one cell aggregate, (5) cells contained in the cell aggregate are spheres, (6) a diameter of one cell is calculated from the volume of one cell, (7) a surface area of one cell is calculated from the diameter of one cell, and was used as a surface area in contact with the medium per cell, and wherein the calculation of each of the values was performed according to the following equations:

$$(\text{Volume of cell aggregate}) = 4/3 \times \pi(\text{pi}) \times ((\text{diameter of cell aggregate})/2)^3$$

$$(\text{Volume of one cell}) = (\text{volume of cell aggregate})/(\text{number of cells contained in one cell aggregate})$$

$$(\text{Diameter of one cell}) = 2 \times (3/(4 \times \pi) \times (\text{volume of one cell}))^{1/3}$$

$$(\text{Surface area in contact with medium per cell}) = 4 \times \pi \times ((\text{diameter of one cell})/2)^2.$$

4. A production method for somatic cells, the method comprising:
producing pluripotent stem cells by the method according to claim 1; and
culturing the pluripotent stem cells in the presence of a differentiation-inducing factor.

5. The production method according to claim 4, wherein the somatic cells are selected from the group consisting of endoderm cells, mesoderm cells, and ectoderm cells.

* * * * *